United States Patent
Kubota et al.

(10) Patent No.: US 11,513,221 B2
(45) Date of Patent: Nov. 29, 2022

(54) DISTANCE MEASUREMENT PROCESSING DEVICE, IMAGE PROCESSING METHOD, AND DISTANCE MEASURING SYSTEM COMPRISING A RELIABILITY-DEGREE GENERATION CIRCUIT

(71) Applicants: KABUSHIKI KAISHA TOSHIBA, Minato-Ku (JP); TOSHIBA ELECTRONIC DEVICES & STORAGE CORPORATION, Minato-Ku (JP)

(72) Inventors: Hiroshi Kubota, Fussa (JP); Nobu Matsumoto, Ebina (JP)

(73) Assignees: KABUSHIKI KAISHA TOSHIBA, Minato-Ku (JP); TOSHIBA ELECTRONIC DEVICES & STORAGE CORPORATION, Minato-Ku (JP)

( * ) Notice: Subject to any disclaimer, the term of this patent is extended or adjusted under 35 U.S.C. 154(b) by 931 days.

(21) Appl. No.: 16/351,983

(22) Filed: Mar. 13, 2019

(65) Prior Publication Data
US 2019/0317213 A1    Oct. 17, 2019

(30) Foreign Application Priority Data
Apr. 17, 2018    (JP) ............... JP2018-079090

(51) Int. Cl.
*G01S 17/89*    (2020.01)
*G01S 17/08*    (2006.01)
(Continued)

(52) U.S. Cl.
CPC ............ *G01S 17/08* (2013.01); *G01S 7/4804* (2013.01); *G01S 7/4913* (2013.01)

(58) Field of Classification Search
CPC .......... G01S 17/00; G01S 17/02; G01S 17/04; G01S 17/06; G01S 17/08; G01S 17/10;
(Continued)

(56) References Cited

U.S. PATENT DOCUMENTS 8,831,908 B2    9/2014    Kamitani et al.
9,488,721 B2    11/2016    Kitajima et al.
(Continued)

FOREIGN PATENT DOCUMENTS

EP    2 854 103 A1    4/2015
JP    2010-164463 A    7/2010
(Continued)

OTHER PUBLICATIONS

Edeler, T. et al. "Uncertainty analysis for optical time-of-flight sensors based on four-phase-shift range calculation" 2014 IEEE Sensors Applications Symposium (Sas), XP032586858, 2014, 6 pages.
(Continued)

*Primary Examiner* — Que Tan Le
(74) *Attorney, Agent, or Firm* — Oblon, McClelland, Maier & Neustadt, L.L.P.

(57) ABSTRACT

A distance measurement processing device according to an embodiment includes an information acquisition circuit and a reliability-degree generation circuit. The information acquisition circuit acquires a two-dimensional distance image having a measured distance as a pixel value and signal information concerning a signal value corresponding to the measured distance image. The reliability-degree generation circuit sets, for each of the pixels of the two-dimensional distance image, each of the pixels as a center pixel and generates a reliability degree based on information concerning the pixels having distance values equal to or smaller than a predetermined value from a distance value of the center
(Continued)

pixel among the pixels contiguous within a predetermined range from the center pixel and a signal value corresponding to the center pixel.

20 Claims, 18 Drawing Sheets

(51) Int. Cl.
*G01S 7/48* (2006.01)
*G01S 7/4913* (2020.01)

(58) Field of Classification Search
CPC ... G01S 17/42; G01S 7/48; G01S 7/49; G01S 17/88; G01S 17/89; G06T 2207/10; G06T 2207/00; G06T 1/00; G06T 5/00
USPC .................... 250/208.1, 214 R, 221
See application file for complete search history.

(56) References Cited

U.S. PATENT DOCUMENTS

| | | |
|---|---|---|
| 2009/0190007 A1 | 7/2009 | Oggier et al. |
| 2014/0313527 A1 | 10/2014 | Askan |
| 2017/0363740 A1 | 12/2017 | Kubota et al. |
| 2019/0086542 A1 | 3/2019 | Kubota et al. |
| 2021/0025980 A1* | 1/2021 | Ohki ............... G01S 7/487 |

FOREIGN PATENT DOCUMENTS

| | | |
|---|---|---|
| JP | 2011-215005 A | 10/2011 |
| JP | 2014-35302 A | 2/2014 |
| JP | 5624998 B2 | 11/2014 |
| JP | 2015-175752 A | 10/2015 |
| JP | 2019-52978 A | 4/2019 |

OTHER PUBLICATIONS

Agresti, G. et al. "Deep Learning for Confidence Information in Stereo and ToF Data Fusion" 2017 IEEE International Conference on Computer Vision Workshops (ICCVW), XP033303513, 2017, 9 pages.

Shuji Oishi, et al., "Smoothing of the Distance Picture using Laser Reflective Intensity" IPSJ, MIRU 2011, Jul. 20, 2011, pp. 1292-1297.

Niclass, C., et al., "A 0.18um CMOS SoC for a 100m-Range 10fps 200x96 -Pixel Time-of-Flight Depth Sensor", ISSCC, Session 27, Image Sensors, 27.6, Digest of Technical Papers, 2013, pp. 488-489.

Oishi, S., et al., "Denoising of Range Images using aTrilateral Filter and Belief Propagation", Intelligent Robots and Systems, 2011, pp. 2020-2027.

Choudhury, P. et al., "The Trilateral Filter for High Contrast Images and Meshes", Eurographics Symposium on Rendering, 2003, 12 pages.

Ito, S,, et al., "Small Imaging Depth LIDAR and DCNN-Based Localization for Automated Guided Vehicle", Sensors 2018, 18, 177, pp. 1-14.

* cited by examiner

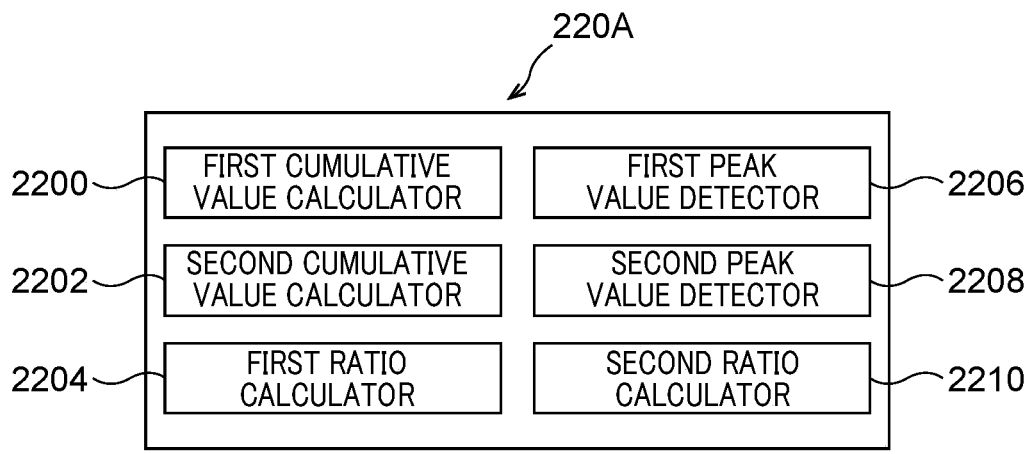
FIG.11
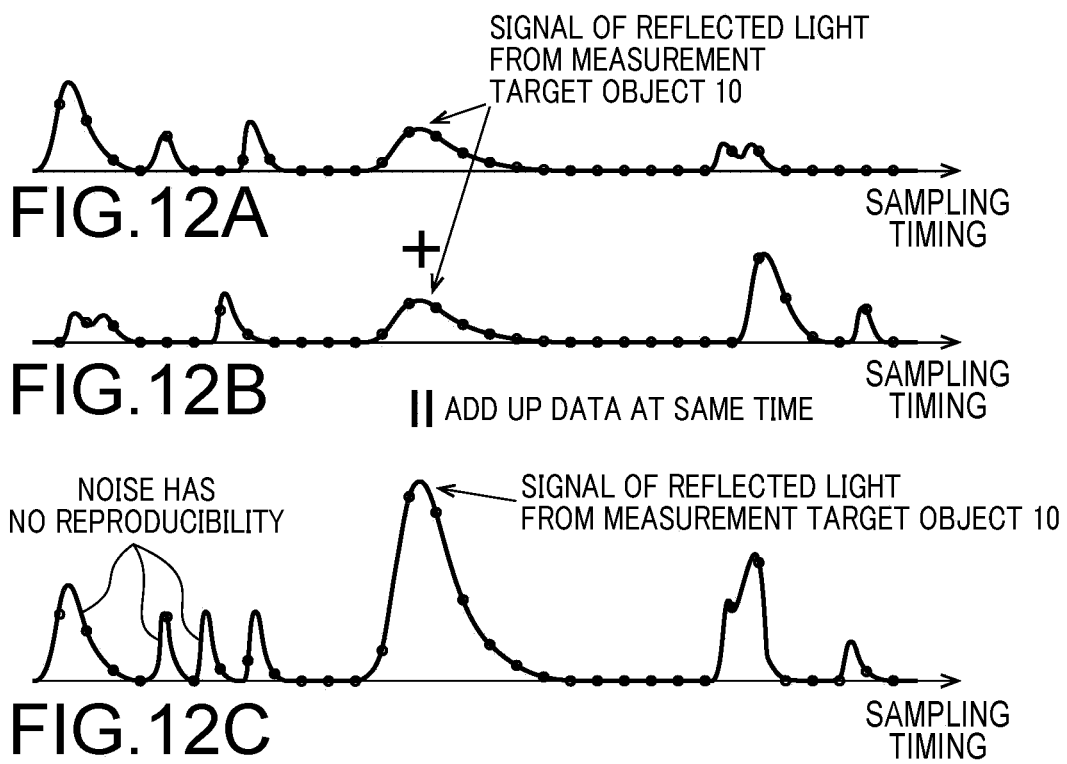

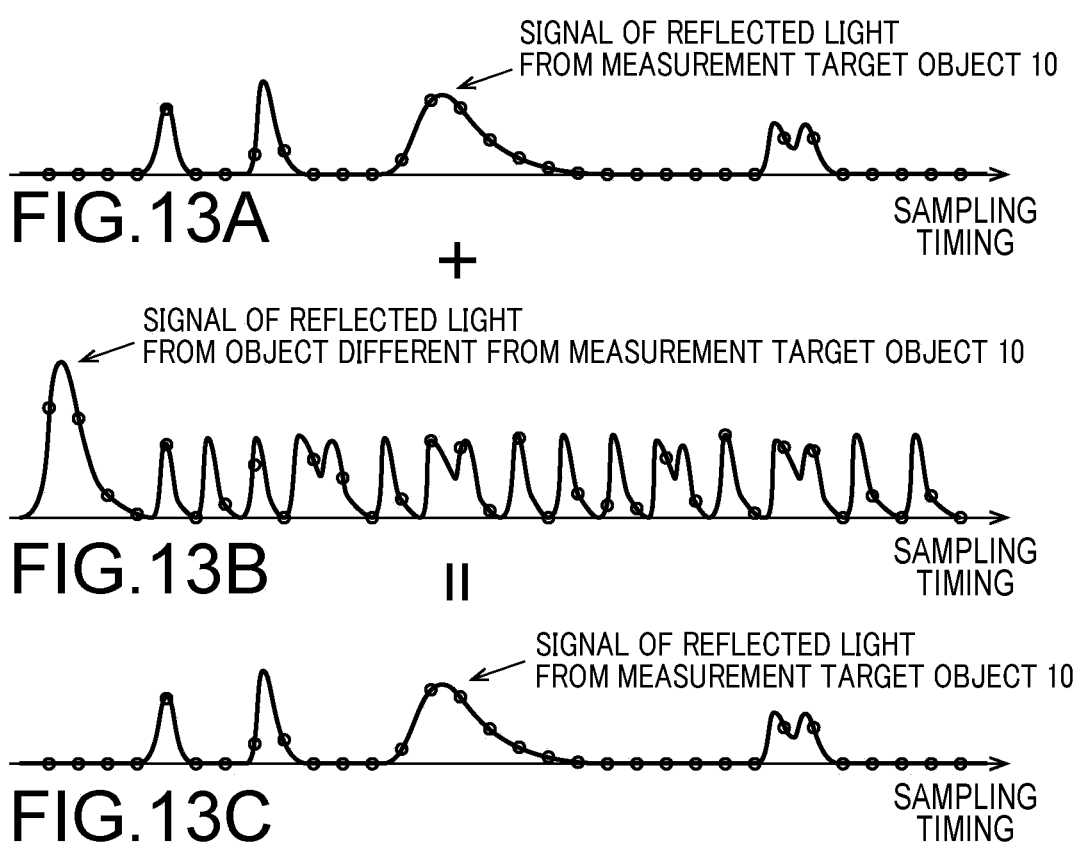

| 01b | 01b | 01b | 01b | 01b | 01b | 01b | 01b | 01b |
|-----|-----|-----|-----|-----|-----|-----|-----|-----|
| 01b | 01b | 01b | 01b | 11b | 01b | 01b | 01b | 01b |
| 01b | 01b | 01b | 01b | 01b | 01b | 01b | 01b | 01b |

FIG.18

| 00b | 00b | 00b | 01b | 01b | 01b | 01b | 01b | 00b |
|-----|-----|-----|-----|-----|-----|-----|-----|-----|
| 00b | 00b | 01b | 01b | 11b | 01b | 01b | 01b | 00b |
| 00b | 01b | 01b | 01b | 01b | 01b | 00b | 00b | 00b |

FIG.19

//  DISTANCE MEASUREMENT PROCESSING DEVICE, IMAGE PROCESSING METHOD, AND DISTANCE MEASURING SYSTEM COMPRISING A RELIABILITY-DEGREE GENERATION CIRCUIT

CROSS-REFERENCE TO RELATED APPLICATIONS

This application is based upon and claims the benefit of priority from the prior Japanese Patent Application No. 2018-079090, filed on Apr. 17, 2018 the entire contents of which are incorporated herein by reference.

FIELD

Embodiments of the present invention relate to a distance measurement processing device, an image processing method, and a distance measuring system.

BACKGROUND

There is known a distance measuring system called LIDAR (Light Detection and Ranging, Laser Imaging Detection and Ranging). The distance measuring device irradiates laser light on a measurement target object and converts the intensity of reflected light reflected by the measurement target object into a time-series digital signal on the basis of an output of a sensor. Consequently, the distance to the measurement target object is measured on the basis of a time difference between a point in time of emission of the laser light and a point in time corresponding to a peak of a signal value of the digital signal. Environment light such as sunlight scattered by an object is also made incident on the sensor. The environment light is noise that occurs at random.

In the distance measuring system, a plurality of digital signals based on laser lights irradiated in adjacent directions are accumulated and processing for improving an S/N ratio is performed. However, if the plurality of digital signals are accumulated, it is likely that clustering of noise occurs.

BRIEF DESCRIPTION OF THE DRAWINGS

FIG. 11 is a block diagram showing a detailed configuration of an accumulation processor;

FIGS. 12A to 12C are diagrams schematically showing weighted accumulation of second digital signals having high similarity;

FIGS. 13A to 13C are diagrams schematically showing weighted accumulation of second digital signals having low similarity;

FIG. 18 is a diagram showing an arrangement pattern example of a coefficient $C(i, j)$;

FIG. 19 is a diagram showing an arrangement pattern example of a value of $C(i, j)$ used in a second reliability degree $R2_i$;

DETAILED DESCRIPTION

Figure 1:
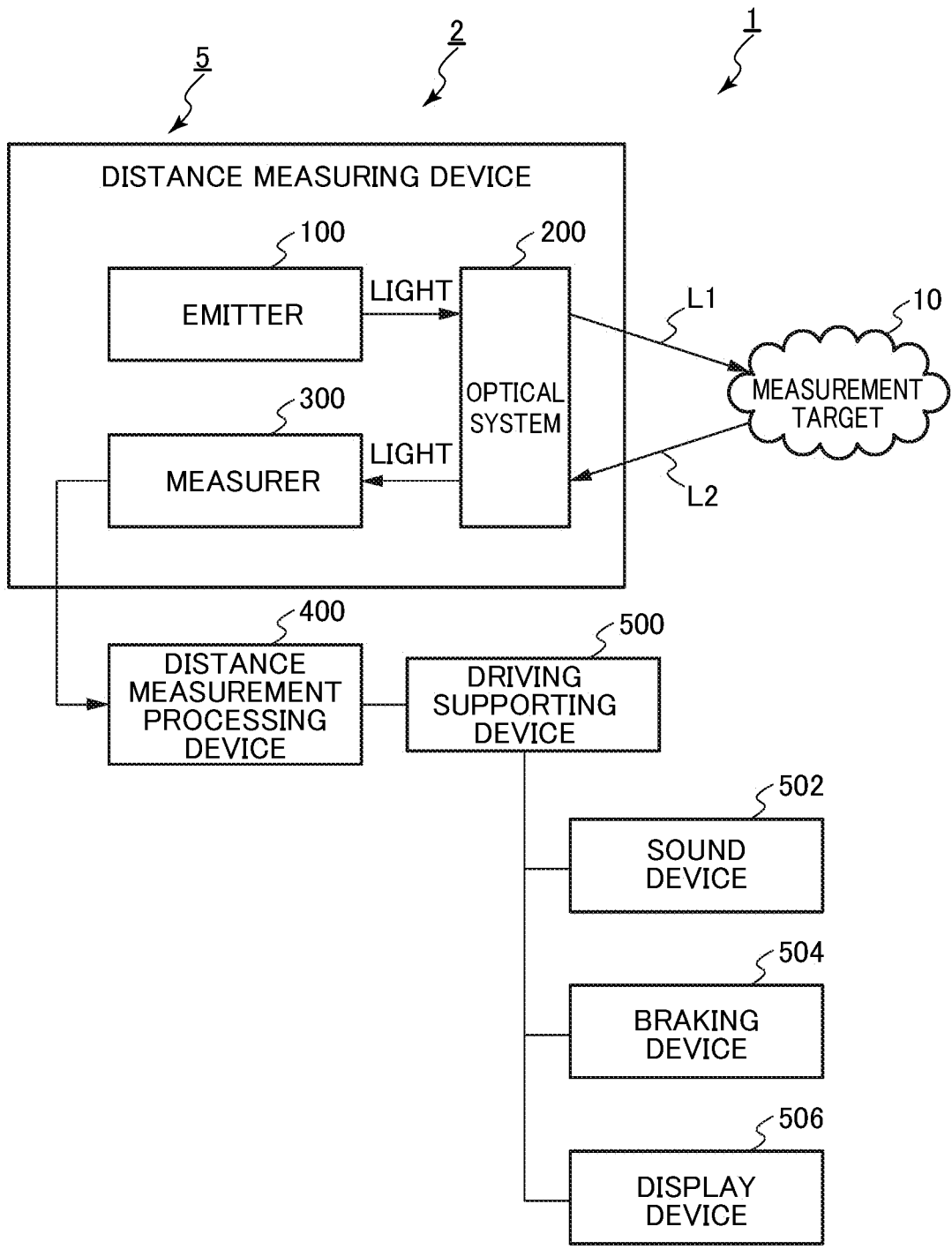
FIG. 1 is a diagram showing a schematic overall configuration of a distance measuring device according to the embodiment.

A distance measurement processing device according to an embodiment includes an information acquisition circuit and a reliability-degree generation circuit. The information acquisition circuit acquires a two-dimensional distance image having a measured distance as a pixel value and signal information concerning a signal value corresponding to the measured distance for each of pixels (when a plurality of distance values (referred to as return) are output for one pixel; for each of the distance values) in the two-dimensional distance image. The reliability-degree generation circuit sets, for each of the pixels of the two-dimensional distance image, each of the pixels as a center pixel and generates a reliability degree based on information concerning the pixels having distance values equal to or smaller than a predetermined value from a distance value of the center pixel among the pixels contiguous within a predetermined range from the center pixel and a signal value corresponding to the center pixel. The distance image indicates information in which distance values from a certain observation point to a target object are spatially (usually, two-dimensional spatially) distributed and information in which the distance values are arranged like an image. In the following explanation, in some case, a distance of the distance image is set as a pixel value and processing for the distance is represented as image processing.

A distance measurement processing device, an image processing method, a distance measuring device, and a distance measuring system according to an embodiment of the present invention are explained in detail below with reference to the drawings. Note that the embodiments explained below are examples of embodiments of the present invention. The present invention is not interpreted to be limited to the embodiments. In the drawings referred to in the embodiments, the same circuits and circuits having the same functions are denoted by the same or similar reference numerals and signs. Repeated explanation of the portions is sometimes omitted. Dimension ratios of the drawings are sometimes different from actual ratios for convenience of explanation. A circuit of components is sometimes omitted from the drawings.

Embodiment

FIG. 1 is a diagram showing a schematic overall configuration of a driving supporting system 1 according to an embodiment. As shown in FIG. 1, the driving supporting system 1 performs driving support based on a distance image. The driving supporting system 1 includes a distance measuring system 2, driving supporting device 500, a sound device 502, a braking device 504, and a display device 506. The distance measuring system 2 generates a distance image of a measurement target object 10 and includes a distance measuring device 5 and a distance measurement processing device 400. Note that the distance measurement processing device 400 is sometime integrated with the distance measuring device 5.

The distance measuring device 5 measures a distance to the measurement target object 10 using a scanning scheme or a TOF (Time Of Flight) scheme. More specifically, the distance measuring device 5 includes an emission circuit 100, an optical mechanism system 200, a measurement circuit 300, and a distance measurement processing device 400.

The emission circuit 100 intermittently emits laser light L1. The optical mechanism system 200 irradiates the laser light L1 emitted by the emission circuit 100 on the measurement target object 10 and makes reflected light L2 of the laser light L1 reflected on the measurement target object 10 incident on the measurement circuit 300. The laser light means light having an aligned phase and an aligned frequency.

The measurement circuit 300 measures the distance to the measurement target object 10 on the basis of the reflected light L2 received via the optical mechanism system 200. That is, the measurement circuit 300 measures the distance to the measurement target object 10 on the basis of a time difference between a point in time when the emission circuit 100 irradiates the laser light L1 on the measurement target object 10 and a point in time when the reflected light L2 is measured.

The distance measurement processing device 400 performs noise reduction processing and outputs distance image data on the basis of distances to a plurality of measurement points on the measurement target object 10. One or all of circuits of the distance measurement processing device 400 may be incorporated in a housing of the distance measuring device 5. A detailed configuration of the distance measurement processing device 400 is explained below.

The driving supporting device 500 supports driving of a vehicle according to an output signal of the distance measurement processing device 400. The sound device 502, the braking device 504, the display device 506, and the like are connected to the driving supporting device 500.

The sound device 502 is, for example, a speaker and is dispose in a position audible from a driver's seat in the vehicle. The driving supporting device 500 causes, on the basis of an output signal of the distance measurement processing device 400, for example, the sound device 502 to generate sound such as "five meter to a target object". Consequently, for example, even when attention of the driver decreases, it is possible to cause the driver to hear the sound to call the attention of the driver.

The braking device 504 is, for example, an auxiliary brake. The driving supporting device 500 causes, on the basis of an output signal of the distance measurement processing device 400, the braking device 504 to brake the vehicle, for example, when the target object approaches a predetermined distance, for example, 3 meters to the vehicle.

The display device 506 is, for example, a liquid crystal monitor. The driving supporting device 500 displays an image on the display device 506 on the basis of an output signal of the distance measurement processing device 400. Consequently, for example, even at the time of backlight, it is possible to accurately grasp external world information by referring to the image displayed on the display device 506.

Figure 2:
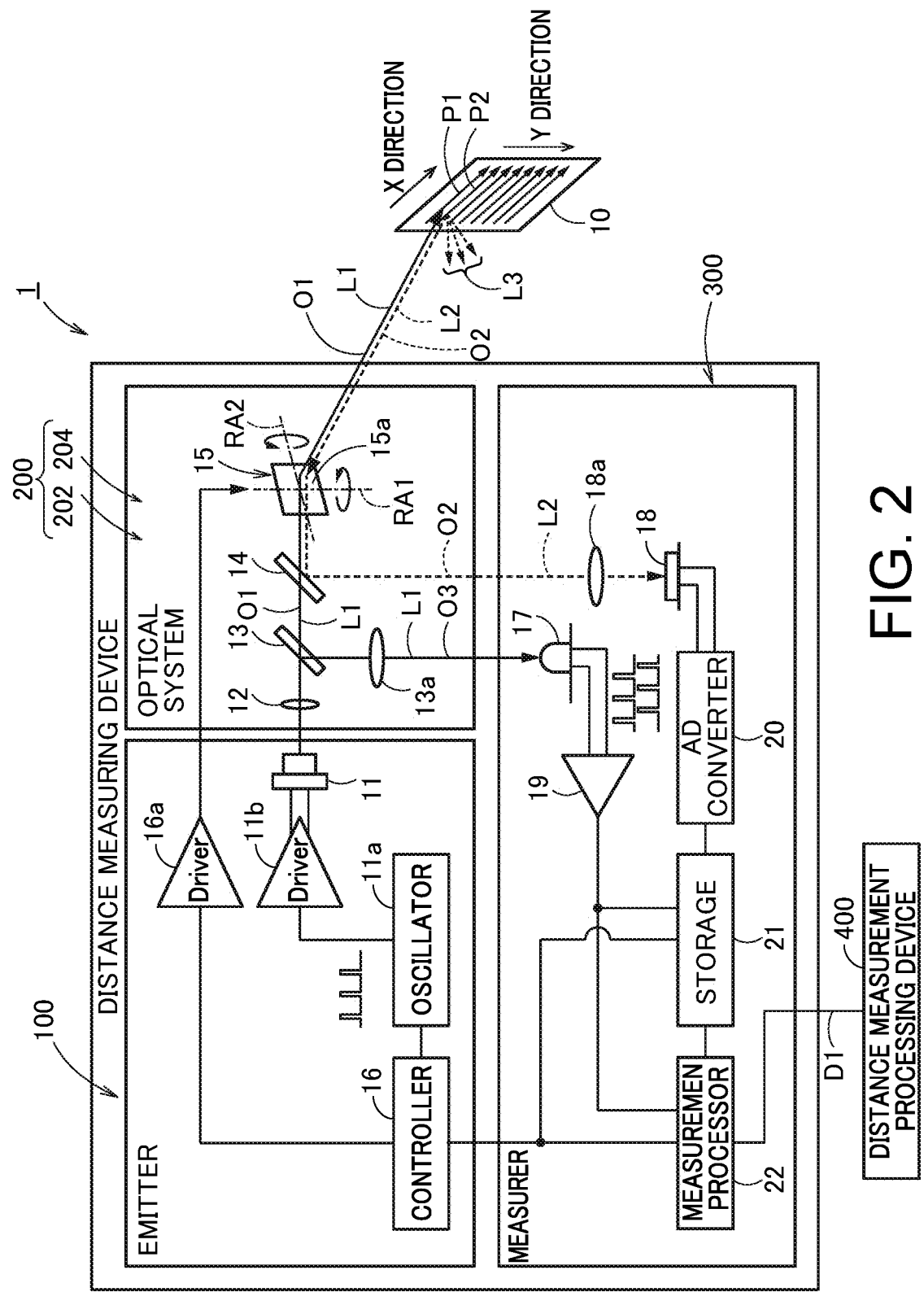
FIG. 2 is a diagram showing a configuration example of the distance measuring device according to the embodiment.

More detailed configuration examples of the emission circuit 100, the mechanism optical mechanism system 200, and the measurement circuit 300 of the distance measuring device 5 according to the embodiment are explained with reference to FIG. 2. FIG. 2 is a diagram showing a configuration example of the distance measuring device 5 according to the first embodiment. As shown in FIG. 2, the distance measuring device 5 includes the emission circuit 100, the optical mechanism system 200, the measurement circuit 300, and the distance measurement processing device 400. Among scattered lights L3, scattered light in a predetermined direction is referred to as reflected light L2.

The emission circuit 100 includes a light source 11, an oscillator 11a, a first driving circuit 11b, a control circuit 16, and a second driving circuit 16a.

The optical mechanism system 200 includes an irradiation optical system 202 and a light-receiving optical system 204. The irradiation optical system 202 includes a lens 12, a first optical element 13, a lens 13a, and a mirror (a reflection device) 15.

The light-receiving optical system 204 includes a second optical element 14 and the mirror 15. That is, the irradiation optical system 202 and the light-receiving optical system 204 share the mirror 15.

The measurement circuit 300 includes a photodetector 17, a sensor 18, a lens 18a, a first amplifier 19, an AD conversion circuit 20, a storage circuit 21, and a measurement processing circuit 22. Note that, as an existing method for scanning light, there is a method of rotating the distance measuring device 5 to scan light (hereinafter referred to as rotating method). As another existing method for scanning light, there is an OPA method (Optical Phased Array). This embodiment does not rely on a method of scanning light. Therefore, light may be scanned by the rotating method or the OPA method.

The oscillator 11a of the emission circuit 100 generates a pulse signal on the basis of control by the control circuit 16. The first driving circuit 11b drives the light source 11 on the basis of the pulse signal generated by the oscillator 11a. The light source 11 is a laser light source such as a laser diode.

The light source 11 intermittently emits the laser light L1 according to driving by the first driving circuit 11b.

Figure 3:
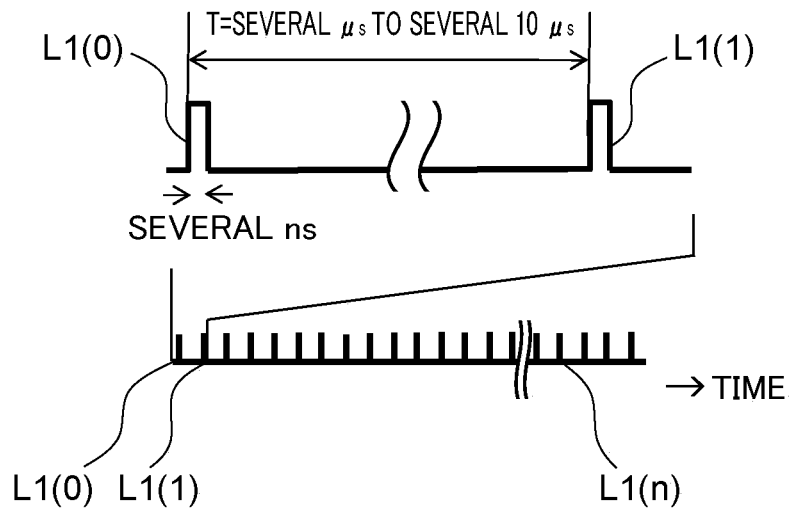
FIG. 3 is a diagram schematically showing an emission pattern of a light source.

FIG. 3 is a diagram schematically showing an emission pattern of the light source 11. In FIG. 3, the horizontal axis indicates time and the vertical axis indicates emission timing of the light source 11. A figure on the upper side is an enlarged view in a figure on the lower side. As shown in FIG. 3, the light source 11 intermittently repeatedly emits laser light L1(n) (0≤n<N), for example, at an interval of T=several microseconds to several ten microseconds. The laser light L1 emitted n-th is represented as L1(n). For example, "N" indicates the number of times of irradiation of the laser light L1(n) irradiated to measure the measurement target object 10.

As shown in FIG. 2, the light source 11, the lens 12, the first optical element 13, the second optical element 14, and the mirror 15 are disposed in this order on an optical axis O1 of the irradiation optical system 202. Consequently, the lens 12 collimates the intermittently emitted laser light L1 and guides the laser light L1 to the first optical element 13.

The first optical element 13 transmits the laser light L1 and makes a circuit of the laser light L1 incident on the photodetector 17 along an optical axis O3. The first optical element 13 is, for example, a beam splitter.

The second optical element 14 further transmits the laser light L1 transmitted through the first optical element 13 and makes the laser light L1 incident on the mirror 15. The second optical element 14 is, for example, a half mirror.

The mirror 15 includes a reflection surface 15a that reflects the laser light L1 intermittently emitted from the light source 11. The reflection surface 15a is capable of rotating around, for example, two rotation axes RA1 and RA2 crossing each other. Consequently, the mirror 15 cyclically changes an irradiation direction of the laser light L1.

The control circuit 16 includes, for example, a CPU (Central Processing Unit). The control circuit 16 performs, on the second driving circuit 16a, control for continuously changing an inclination angle of the reflection surface 15a. The second driving circuit 16a drives the mirror 15 according to a driving signal supplied from the control circuit 16. That is, the controller 16 controls the second driving circuit 16a to change the irradiation direction of the laser light L1.

Figure 4:
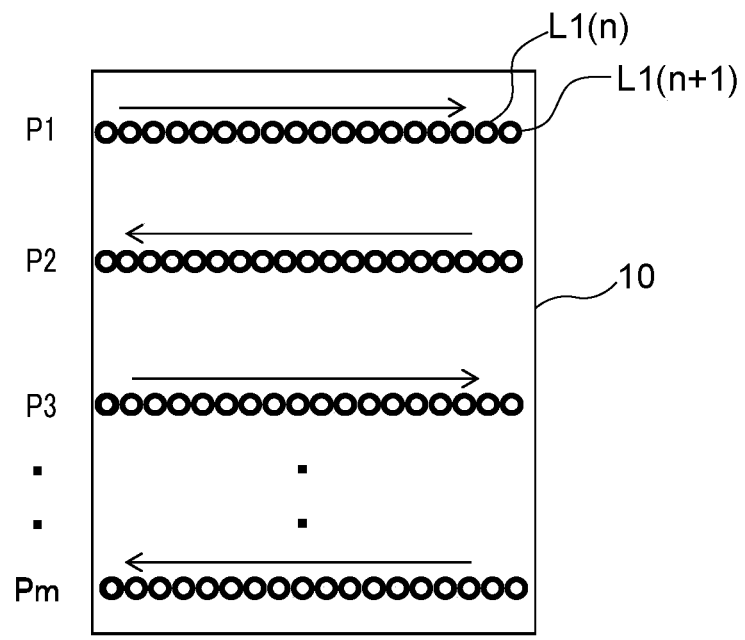
FIG. 4 is a schematic diagram enlarging and showing irradiation positions of respective laser lights on a measurement target object.

FIG. 4 is a schematic diagram enlarging and showing irradiation positions of the laser light L1 on the measurement target object 10. As shown in FIG. 4, the reflection surface 15a changes the irradiation direction for each laser light L1 and discretely irradiates the laser light L1 along a substantially parallel plurality of linear paths P1 to Pm (m is a natural number equal to or larger than 2) on the measurement target object 10. In this way, the distance measuring device 5 according to this embodiment irradiates the laser light L1(n) (0≤n<N) toward the measurement target object 10 once at a time while changing an irradiation direction O(n) (0≤n<N) of the laser light L1(n). The irradiation direction of the laser light L1(n) is represented as O(n). That is, in the distance measuring device 5 according to this embodiment, the laser light L1(n) is irradiated once in the irradiation direction O(n). The laser light L1(n) according to this embodiment is sequentially irradiated on one point at a time. However, not only this, but the laser light L1(n) may be simultaneously irradiated on a plurality of points. For example, a vertical one row may be simultaneously irradiated using a one-dimensional laser light source.

An interval of irradiation positions of laser lights L1(n) and L1(n+1) on the measurement target object 10 corresponds to the irradiation interval T=several microseconds to several ten microseconds (FIG. 3) between the laser lights L1. In this way, the laser lights L1 having different irradiation directions are discretely irradiated on the linear paths P1 to Pm. Note that the number of linear paths and a scanning direction are not particularly limited.

As shown in FIG. 2, on an optical axis O2 of the light receiving optical system 204, the reflection surface 15a of the mirror 15, the second optical element 14, the lens 18a, and the sensor 18 are disposed in the order of incidence of the reflected light L2. The optical axis O1 is a focal axis of the lens 12 that passes the center position of the lens 12. The optical axis O2 is a focal axis of the lens 18a that passes the center position of the lens 18a.

The reflection surface 15a makes the reflected light L2 traveling along the optical axis O2 among the scattered lights L3 scattered on the measurement target object 10 incident on the second optical element 14. The second optical element 14 changes a traveling direction of the reflected light L2 reflected on the reflection surface 15a and makes the reflected light L2 incident on the lens 18a of the measurement circuit 300 along the optical axis O2. The lens 18a collimates the reflected light L2 made incident along the optical axis O2 to the sensor 18.

On the other hand, a traveling direction of light reflected in a direction different from the direction of the laser light L1 among the scattered lights L3 deviates from the optical axis O2 of the light-receiving optical system 204. Therefore, even if the light reflected in the direction different from the direction of the optical axis O2 among the scattered lights L3 is made incident in the light-receiving optical system 204, the light is absorbed by a black body in a housing in which the light-receiving optical system 204 is disposed or is made incident on a position deviating from an incident surface of the sensor 18. On the other hand, among environment lights such as sunlight scattered by some object, there are lights traveling along the optical axis O2. These lights are made incident on the incident surface of the sensor 18 at random and become random noise.

Note that, in FIG. 2, optical paths of the laser light L1 and the reflected light L2 are separately shown for clarification. However, actually, the laser light L1 and the reflected light L2 overlap. An optical path in the center of a light beam of the laser light L1 is shown as the optical axis O1. Similarly, an optical path of the center of a light beam of the reflected light L2 is shown as the optical axis O2.

The sensor 18 detects the reflected light L2 made incident from the lens 18a. The sensor 18 converts the reflected light L2 received via the light-receiving optical system 204 into an electric signal.

The AD conversion circuit 20 converts the electric signal output by the sensor 18 into a digital signal at a predetermined sampling interval. The AD conversion circuit 20 is configured by, for example, an amplifier that amplifies the electric signal based on the reflected light L2 and an AD converter (ADC: Analog to Digital Converter). The amplifier amplifies the electric signal of the sensor 18. The AD converter samples the amplified electric signal at a plurality of sampling timings and converts the electric signal into a digital signal corresponding to an irradiation direction of the laser light L1.

Figure 5:
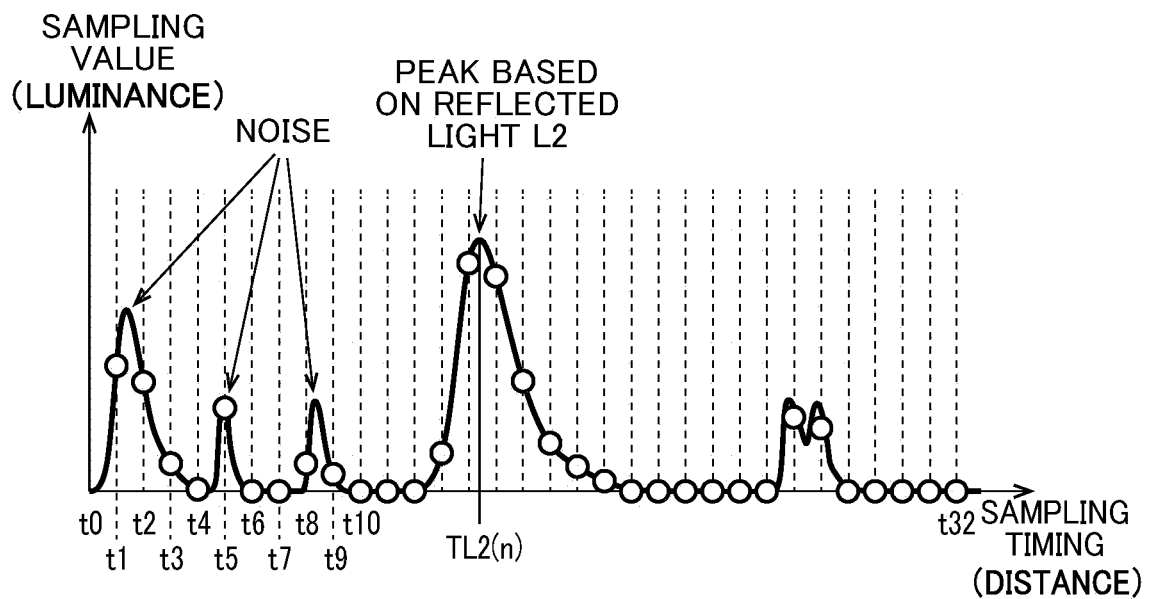
FIG. 5 is a diagram showing an example of a sampling value of an electric signal by an AD conversion circuit.

FIG. 5 is a diagram showing an example of a sampling value of the electric signal by the AD conversion circuit 20. The horizontal axis of FIG. 5 indicates sampling timing and the vertical axis indicates a sampling value (luminance), that is, a value of a digital signal. The sampling timing corresponds to a distance. For example, sampling timings obtained by adding a blanking time to sampling timings t0 to t32 correspond to an elapsed time "T" (FIG. 3) from when the laser light L1 is irradiated until the next laser light L1 is irradiated. A peak in the figure is a sampling value based on the reflected light L2. Sampling timing TL2 indicating the peak corresponds to a double of the distance to the measurement target object 10.

More specifically, the distance is calculated by the following expression: distance=light speed×(sampling timing TL2−timing when the photodetector 17 detects the laser light L1)/2. The sampling timing is an elapsed time from light emission start time of the laser light L1. The timing when the photodetector 17 detects the laser light L1 is the light emission start time of the laser light L1.

Note that the number of sampling timings and a time range in which sampling is performed shown in the figure are examples. The number of sampling timings and the time range in which the sampling is performed may be changed.

As shown in FIG. 2, the storage circuit 21 is realized by, for example, a semiconductor memory element such as a RAM (Random Access Memory) or a flash memory, a hard disk, or an optical disk. The control circuit 16 causes the storage circuit 21 to store, in time series, information concerning an irradiation direction of the mirror 15 at timing when the laser light L1 is irradiated and a digital signal of the laser light L1 in association with each other. That is, the storage circuit 21 stores, in time series, a first digital signal converted by the AD conversion circuit 20 in association with each of irradiation directions of the laser light L1.

The measurement processing circuit 22 is, for example, an MPU (Micro Processing Unit). The measurement processor 22 measures a distance on the basis of a time difference between timing when the photodetector 17 detects the laser light L1 and timing when the sensor 18 detects the reflected light L2.

Figure 6:
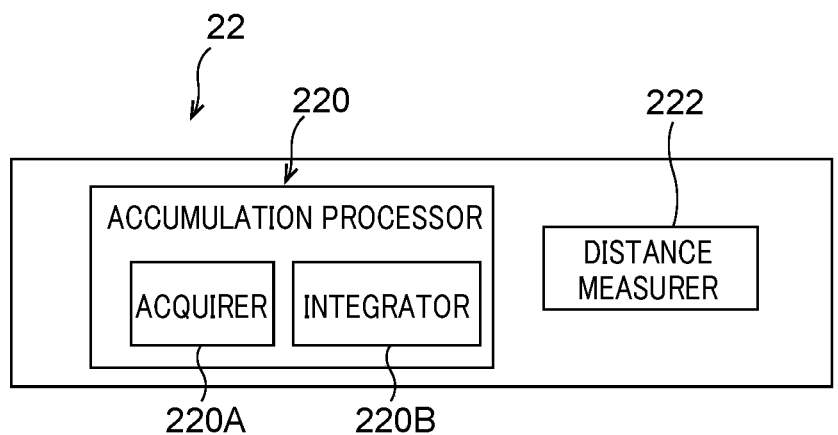
FIG. 6 is a block diagram showing a detailed configuration of a measurement processing circuit.

FIG. 6 is a block diagram showing a detailed configuration of the measurement processing circuit 22. The detailed configuration of the measurement processing circuit 22 is explained with reference to FIG. 6. As shown in FIG. 6, the measurement processing circuit 22 includes an accumulation processing circuit 220 and a distance measurement circuit 222.

The accumulation processing circuit 220 performs processing for obtaining a digital signal for measurement having an S/N ratio improved from an S/N ratio of a digital signal of each laser light L1 stored in the storage circuit 21. The accumulation processing circuit 220 includes an acquisition circuit 220A and an accumulation circuit 220B.

The acquisition circuit 220A generates or acquires, on the basis of similarity stored in the storage circuit 21 between a first digital signal obtained by digitizing the reflected light L2 of the laser light L1 irradiated in a first irradiation direction and a second digital signal obtained by digitizing the reflected light L2 of the laser light L1 irradiated in a second irradiation direction different from the first irradiation direction, a weight value of the second digital signal.

The accumulation circuit 220B accumulates, on the first digital signal, a signal obtained by weighting the second digital signal with the weight value generated by the acquisition circuit 220A and generates a digital signal for measurement (a third digital signal). Detailed processing of the acquisition circuit 220A and the accumulation circuit 220B is explained below.

The distance measurement circuit 222 measures the distance to the measurement target object 10 on the basis of the time-series third digital signal having an improved S/N ratio. More specifically, the distance measurer 224 measures the distance to the measurement target object 10 on the basis of a time difference between a point in time based on irradiation of the laser light L1 and a point in time based on a peak position of a signal value of the third digital signal. The distance measurement circuit 222 supplies, to the distance measurement processing device 400, a signal D1 (FIG. 2) including distance information for each laser light L1, that is, for each irradiation direction and information concerning a signal value corresponding to a peak position of a third digital signal. That is, the distance measurement circuit 222 supplies, to the distance measurement processing device 400, for each irradiation direction, information concerning a measured distance and information concerning a signal value (a luminance value of a peak position) corresponding to a measured distance of a third time-series digital signal based on a plurality of time-series digital signals (a first digital signal and a second digital signal) used for the distance measurement.

A relation between a first irradiation direction of the laser light L1($n$) serving as a reference and second irradiation directions different from the first irradiation direction is explained with reference to FIG. 7.

Figure 7:
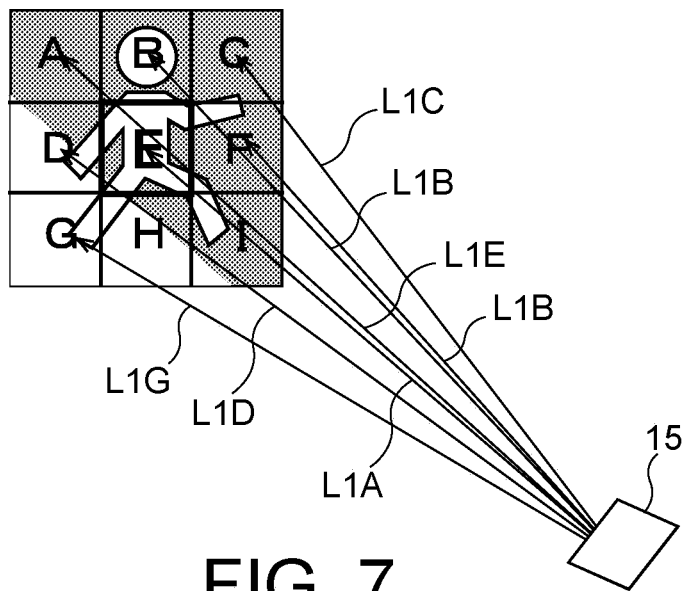
FIG. 7 is a diagram schematically showing reference laser light and laser lights irradiated in adjacent second irradiation directions.

FIG. 7 schematically shows the reference laser light L1($n$) and laser lights L1($n$+ma), L1($n$+mb), L1($n$+mc), L1($n$+md), L1($n$+mf), L1($n$+mg), L1($n$+mh), and L1($n$+mi) irradiated in second irradiation directions. An irradiation direction of the reference laser light L1($n$) is referred to as first irradiation direction. Irradiation directions different from the first irradiation direction are referred to as second irradiation directions. As shown in FIG. 7, L1($n$) serving as the reference corresponds to L1E. Similarly, L1($i$+ma) corresponds to L1A, L1($i$+mb) corresponds to L1B, L1($i$+mc) corresponds to L1C, L1($i$+md) corresponds to L1D, L1($i$+me) corresponds to L1E, L1($i$+mg) corresponds to L1G, and L1($i$+mf) corresponds to L1F.

In FIG. 7, n+ma, n+mb, and n+mc indicating irradiation order of the laser light L1 irradiated in the second irradiation directions are continuous natural numbers within a range of 0≤n≤N. As explained above, "N" indicates the number of times of irradiation of the laser light L1($n$) irradiated to measure the measurement target object 10. Similarly, n+md, n, and n+mf are also continuous natural numbers and n+mg, n+mh, and n+mi are also continuous natural numbers. As shown in FIG. 4, when the number of measurement points on one linear path among a plurality of linear paths P1 to Pm (m is a natural number equal to or larger than 2) is represented as L=N/m, there are relations: n+md=n+ma+L and n+mg=n+md+L.

An example is explained in which the same measurement target object 10 is present at traveling destinations of the laser lights L1($n$+ma), L1($n$+mb), L1($n$+mc), L1($n$+mf), and L1($n$+mi) irradiated in the second irradiation directions and an object different from the measurement target object 10 is present on a nearer side than the measurement target object 10 at traveling destinations of the laser lights L(n+md), L1($n$+mg), and L1($n$+mh) irradiated in the second irradiation directions. That is, a measurement point on the measurement target object 10 on which the reference laser light L1($n$) is irradiated is E. Measurement points on the measurement target object 10 on which the laser lights L1($n$+ma), L1($n$+mb), L1($n$+mc), L1($n$+mf), and L1($n$+mi) irradiated in second irradiation directions adjacent to the laser light L1($n$) are irradiated are A, B, C, F, and I. On the other hand, measurement points on the object different from the measurement target object 10 on which the laser lights L1($n$+md), L1($n$+mg), and L1($n$+mh) are irradiated are D, G, and H. These measurement points are not present on the same plane. However, in FIG. 7, the measurement points are schematically projected on the same plane and displayed.

In this way, ma to mi are changed according to the number "L" of the measurement points on the linear path. Therefore, to simplify explanation, in this embodiment, the laser lights $L1(n+ma)$ to $L1(n+mi)$ irradiated in irradiation directions adjacent to the laser light $L1(n)$ are represented by $L1(n+m(Z))$ $(0 \leq Z \leq (M-1))$. That is, an irradiation order in the second irradiation directions centering on "n" is represented by $n+m(Z)$. "Z" is a natural number. "M" indicates the number of second irradiation directions adjacent to the first irradiation direction. For example, in FIG. 7, since the number of adjacent irradiation directions is M=8, the adjacent second irradiation directions are represented by $L1(n+m(Z))$ $(0 \leq Z \leq 7)$. Consequently, ma to mi can be represented by ma=m(0), mb=m(1), mc=m(2), md=m(3), mf=m(4), mg=m(5), mh=m(6), and mi=m(7). Note that "M" is any number.

In the following explanation, a first digital signal based on reflected light $L2(n)$ of the laser light $L1(n)$ in the first irradiation direction is represented by $D(n)$. Reflected light of the laser light $L1(n+m(Z))$ $(0 \leq Z \leq (M-1))$ in the second irradiation direction adjacent to the laser light $L1(n)$ is represented by $L2(n+m(Z))$ $(0 \leq Z \leq (M-1))$. An irradiation direction of the laser light $L1(n+m(Z))$ $(0 \leq Z \leq (M-1))$ in the second irradiation direction is represented by $O(n+m(Z))$ $(0 \leq Z \leq (M-1))$. A second digital signal based on the reflected light $L2(n+m(Z))$ $(0 \leq Z \leq (M-1))$ is represented by $D(n+m(Z))$ $(0 \leq Z \leq (M-1))$. A cumulative value in a predetermined period TA in the first digital signal $D(n)$ is represented by a first cumulative value $At(n)(t)$. A cumulative value in the predetermined period TA in the second digital signal $D(n+m(Z))$ $(0 \leq Z \leq (M-1))$ is represented by a second cumulative value $At(n+m(Z))(t)$ $(0 \leq Z \leq (M-1))$, where "t" indicates sampling timing.

Figure 8A:
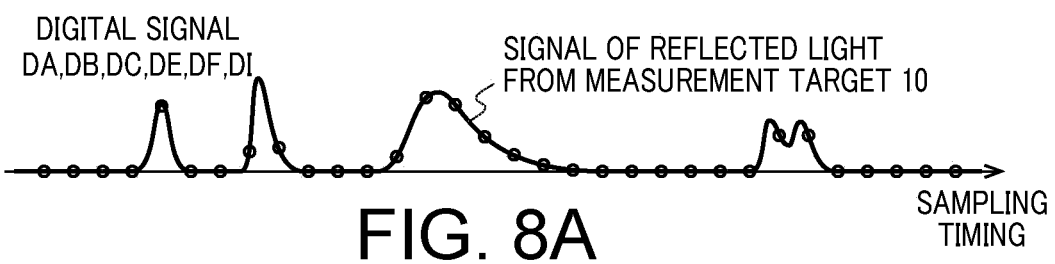
FIGS. 8A and 8B are diagrams schematically showing digital signals obtained on the basis of reflected light shown in FIG. 7.
Figure 8B:
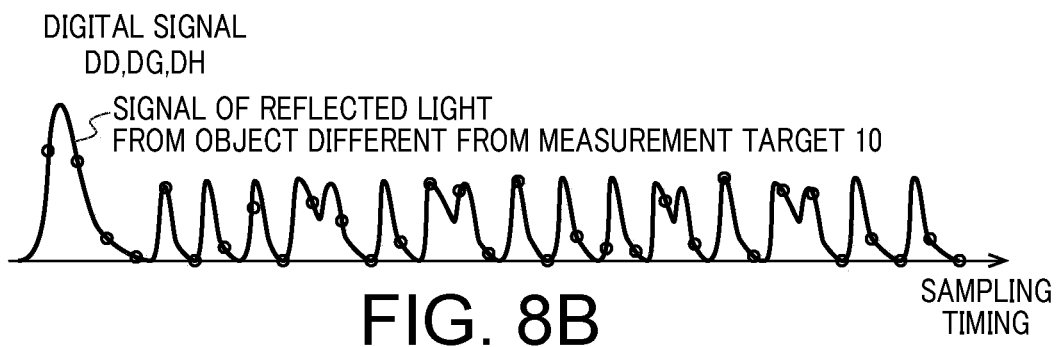

Characteristics of the first digital signal and the second digital signals are explained with reference to FIGS. 8A and 8B in view of FIG. 7. FIGS. 8A and 8B are diagrams schematically showing digital signals DA, DB, DC, DD, DE, DF, DG, DH, and DI obtained on the basis of reflected lights of the laser lights $L1(n+ma)$, $L1(n+mb)$, $L1(n+mc)$, $L1(n+md)$, $L1(n)$, $L1(n+mf)$, $L1(n+mg)$, $L1(n+mh)$, and $L1(n+mi)$ shown in FIG. 7. That is, the first digital signal $D(n)$ is indicated by first digital signal DE. The second digital signals $D(n+m(Z))$ $(0 \leq Z \leq 7)$ are respectively indicated by second digital signals DA, DB, DC, DD, DF, DG, DH, and DI.

FIG. 8A schematically shows the digital signals DA, DB, DC, DE, DF, and DI obtained on the basis of reflected light reflected from the same measurement target object 10. FIG. 8B schematically shows the digital signals DD, DG, and DH obtained on the basis of reflected lights reflected from an object different from the measurement target object 10. The vertical axis indicates a signal value (a luminance value) and the horizontal axis indicates sampling timing.

As shown in FIG. 8A, there is a tendency that the second digital signals DA, DB, DC, DF, and DI obtained on the basis of the reflected lights L2 reflected from the measurement target object 10 are similar to the first digital signal DE. On the other hand, as shown in FIG. 8B, there is a tendency that the second digital signals DD, DG, and DH obtained on the basis of the reflected lights reflected from the object different from the measurement target object 10 have low similarity to the first digital signal DE.

Cumulative values within a time range TA of the digital signals DA, DB, DC, DD, DE, DF, DG, DH, and DI are explained with reference to FIGS. 9A to 9D in view of FIG. 7 and FIGS. 8A and 8B. FIGS. 9A to 9D are diagrams showing examples of the cumulative values within the time range TA of the digital signals DA, DB, DC, DD, DE, DF, DG, DH, and DI shown in FIGS. 8A and 8B. FIGS. 9A to 9D are, for example, measurement results in the daytime and are examples affected by environment light such as sunlight. The vertical axis indicates a signal value (a luminance value) and the horizontal axis indicates sampling timing.

Figure 9A:
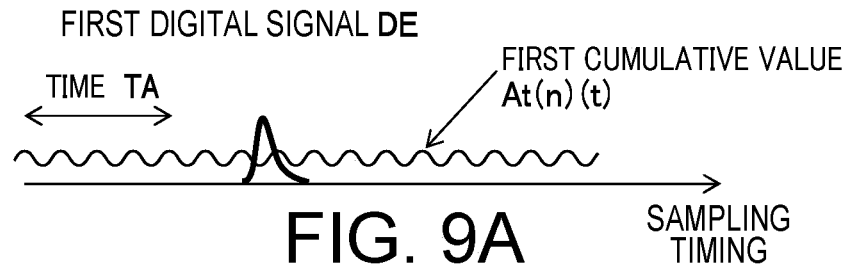
FIGS. 9A to 9D are diagrams showing examples of cumulative values within a time range of the digital signals shown in FIGS. 8A and 8B.

FIG. 9A is a diagram showing the first cumulative value $At(n)(t)$ based on the first digital signal DE. The time range TA of an arrow indicates a time range in which accumulation is performed. The first cumulative value $At(n)(t)$ in FIG. 9A indicates a result obtained by performing accumulation of the first digital signal DE while moving the time range TA in order from 0 to an end time of sampling.

Figure 9B:
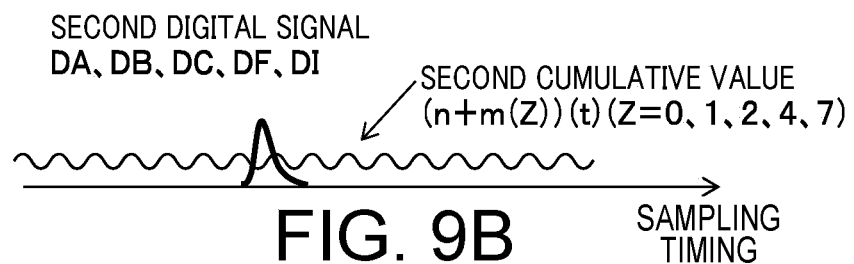
Figure 9C:
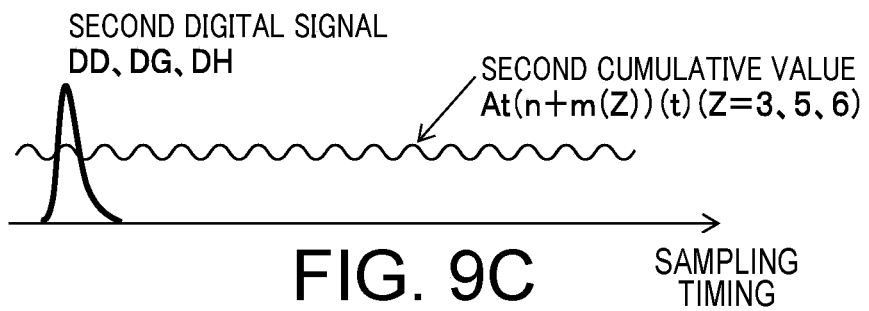

FIG. 9B shows the second cumulative value $At(n+m(Z))(t)$ (Z=0, 1, 2, 4, and 7) based on the second digital signals DA, DB, DC, DF, and DI. FIG. 9C shows the second cumulative value $At(n+m(Z))(t)$ (Z=3, 5, and 6) based on the second digital signals DD, DG, and DH. Details of the first cumulative value $At(n)(t)$ and the second cumulative value $At(n+m(Z))(t)$ are explained below.

Figure 9D:
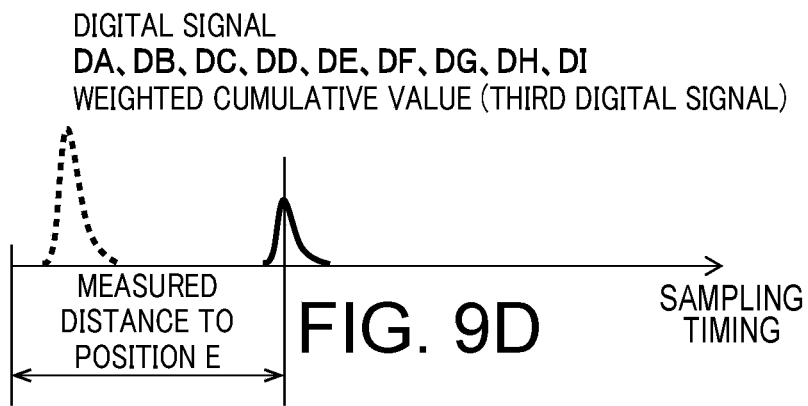

FIG. 9D shows an example of a third digital signal obtained by accumulating the second digital signals DA, DB, DC, DD, DF, DG, DH, and DI on the first digital signal DE on the basis of weight values.

As shown in FIGS. 9A and 9B, there is a tendency that the first cumulative value $At(n)(t)$ obtained by accumulating the first digital signal DE within the time range TA shows substantially the same value as the second cumulative value $At(n+m(Z))(t)$ (Z=0, 1, 2, 4, and 7) obtained by accumulating the respective second digital signals DA, DB, DC, DF, and DI within the time range TA. On the other hand, as shown in FIG. 9C, there is a tendency that the first cumulative value $At(n)(t)$ shows a value different from the second cumulative value $At(n+m(Z))(t)$ (Z=3, 5, and 6) obtained by accumulating the respective second digital signals DD, DG, and DH within the time range TA. This is considered to be because the intensities of environment lights or the like reflected by different reflection target objects are different in each of the target objects. For example, when the measurement points D, G, and H are at nearer distances from the measurement points A, B, C, E, F, and I or an object has a high reflection coefficient, cumulative values of the digital signals within the time range TA tend to increase.

Peak values of the digital signals DA, DB, DC, DD, DE, DF, DG, DH, and DI are explained with reference to FIG. 10 in view of FIG. 7 and FIGS. 8A and 8B. FIGS. 10A to 10D are schematic diagrams showing peak values of digital signals obtained on the basis of the digital signals DA, DB, DC, DD, DE, DF, DG, DH, and DI shown in FIGS. 8A and 8B. The horizontal axis indicates sampling timing and the vertical axis indicates a signal value. FIGS. 10A to 10D are, for example, measurement results at night and are examples in which the influence of environment light such as sunlight is reduced.

Figure 10A:
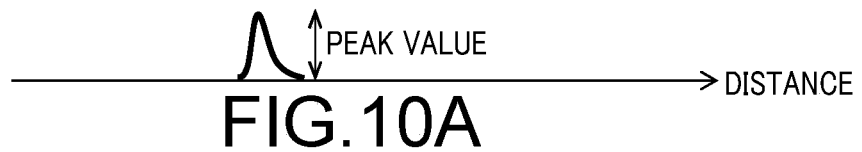
FIGS. 10A to 10D are schematic diagrams showing peak values of digital signals obtained on the basis of the digital signals shown in FIGS. 8A and 8B.
Figure 10B:
Figure 10C:
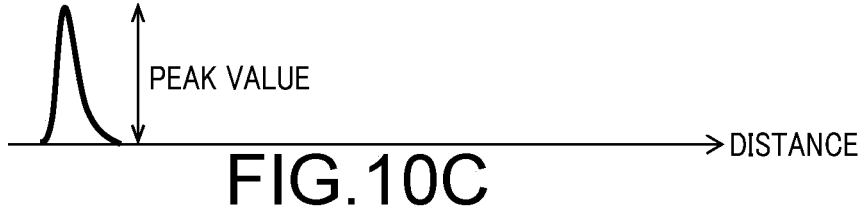
Figure 10D:
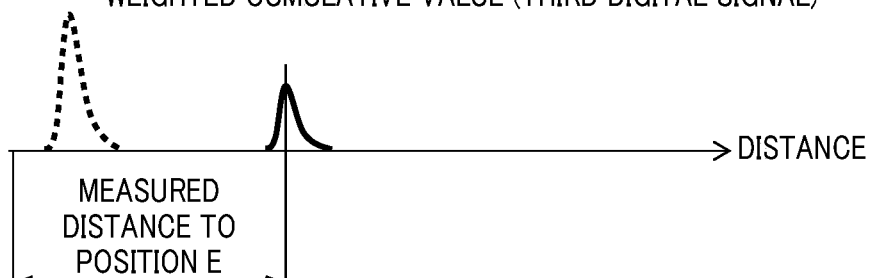

FIG. 10A shows a first peak value based on the first digital signal DE. FIG. 10B shows a second peak value based on the second digital signals DA, DB, DC, DF, and DI. FIG. 10C shows a peak value based on the second digital signals DD, DG, and DH. FIG. 10D shows the third digital signal accumulated on the basis of the weight value. A peak value based on the first digital signal $D(n)$ is referred to as first peak value. A peak value based on the second digital signal $D(n+m(Z))$ $(0 \leq Z \leq (M-1))$ is referred to as second peak value.

As shown in FIGS. 10A and 10B, there is a tendency that the first peak of the first digital signal DE shows the same value as the second peak value of the second digital signals DA, DB, DC, DF, and DI based on reflected light reflected from the same measurement target object 10. On the other hand, as shown in FIG. 10B, there is a tendency that the first peak value of the first digital signal DE and the second peak value of the second digital signals DD, DG, and DH based on reflected light reflected from a different measurement target object 10 show different values.

As shown in FIG. 10D, if weight values of the second digital signals DA, DB, DC, DF, and DI having high similarity are set large, weight values of the second digital signals DD, DG, and DH having low similarity are set small, and the second digital signals DA, DB, DC, DD, DF, DG, DH, and DI are accumulated on the first digital signal DE, it is possible to improve an S/N ratio of a third digital signal Ad. In particular, it is possible to further increase measurement accuracy in measurement at night.

A detailed configuration of the acquisition circuit 220A is explained with reference to FIG. 11 in view of FIG. 7, FIGS. 9A to 9D, and FIGS. 10A to 10D. FIG. 11 is a block diagram showing the detailed configuration of the acquisition circuit 220A. As shown in FIG. 11, the acquisition circuit 220A includes a first cumulative value calculation circuit 2200, a second cumulative value calculation circuit 2202, a first ratio calculation circuit 2204, a first peak value detection circuit 2206, a second peak value detection circuit 2208, and a second ratio calculation circuit 2210.

As shown in FIG. 9A, the first cumulative value calculation circuit 2200 calculates the first cumulative value At(n)(t) obtained by accumulating, within the predetermined period TA, a plurality of first digital signals D(n)(t) obtained by respectively digitizing the reflected lights L2(n) of the laser light L1(n) intermittently irradiated in the first irradiation direction. For example, the first cumulative value calculation circuit 2200 calculates a first cumulative value At(n) according to Expression (1). D(n) is represented by a function D(n)(t) of the sampling timing t.

[Math 1]

$$At(n)(t) = K1 \times \int_{t-TA/2}^{t+TA/2} D(n)(t)dt \quad (1)$$

where, K1 represents any constant and "n" represents a natural number in a range of 0≤n<N.

As shown in FIGS. 9B and 9C, the second cumulative value calculation circuit 2202 calculates the second cumulative value At(n+m(Z))(t) (0≤Z≤(M−1)) obtained by accumulating, within the predetermined period TA, a plurality of second digital signals D(n+m(Z)) (0≤Z≤(M−1)) obtained by respectively digitizing reflected lights of the laser light L1(n+m(Z)) (0≤Z≤(M−1)) intermittently irradiated in the second irradiation directions. The second cumulative value calculation circuit 2202 calculates the second cumulative value At(n+m(Z))(t) (0≤Z≤(M−1)) according to Expression (2). The second digital signal D(n+m(Z)) is represented by a function D(n+m(Z))(t) of the sampling timing t. As explained above, "Z" represents a natural number in a range of 0≤Z≤(M−1) and "M" represents the number of second irradiation directions adjacent to the first irradiation directions.

[Math 2]

$$At(n+m(Z))(t) = K1 \times \int_{t-TA/2}^{t+TA/2} D(n+m(Z))(t)dt \quad (2)$$

The first ratio calculation circuit 2204 calculates a first ratio ERa1(n, n+m(Z)) of the first cumulative value At(n)(t) accumulated by the first cumulative value calculation circuit 2200 and the second cumulative value At(n+m(Z))(t) (0≤Z≤(M−1)) accumulated by the second cumulative value calculation circuit 2202. The first ratio calculation circuit 2204 substitutes any fixed time "T" in "t" of Expressions (1) and (2) and calculates the first ratio ERa1(n, n+m(Z)) according to Expression (3). That is, the first ratio calculation circuit 2204 according to this embodiment uses a cumulative value of digital signals measured in the any fixed time "T" for the calculation of the first ratio ERa1(n, n+m(Z)). It is also possible to insert offset or minimum value processing rather than a simple ratio. In that case, the first ratio ERa1(n, n+m(Z)) is calculated according to Expression (3-2).

[Math 3]

$$ERa1(n, n+m(z)) = \frac{At(n+m(Z))(T)}{At(n)(T)} \quad (3)$$

[Math 3-2]

$$ERa1(n, n+m(z)) = \frac{\text{Max}(At(n+m(Z))(T) + \alpha, \beta)}{\text{Max}(At(n)(T) + \alpha, \beta)} \quad (3-2)$$

For example, as shown in FIG. 10A, the first peak value detection circuit 2206 detects a first peak value Peak(n) (0≤n<N) at which signal amplitude of the first digital signal D(n) (0≤n<N) is maximized or minimized. A first peak value of the first digital signal D(n) is represented by Peak(n).

Similarly, for example, as shown in FIGS. 10B and 10C, the second peak value detection circuit 2208 detects a second peak value Peak(n+m(Z)) (0≤n<N) at which signal amplitude of the second digital signal D(n+m(Z)) is maximized or minimized. "Z" indicates the number of adjacent second irradiation directions. A second peak value of the second digital signal D(n+m(Z)) is represented by Peak(n+m(Z)).

The second ratio calculation circuit 2210 calculates a second ratio ERa2(n, n+m(Z)) of the first peak value Peak(n) detected by the first peak value detection circuit 2206 and the second peak value Peak(n+m(Z)) detected by the second peak value detection circuit 2208. More specifically, the second ratio calculation circuit 2210 calculates the second ratio ERa2(n, n+m(Z)) according to Expression (4). It is also possible to insert offset or minimum value processing rather than a simple ratio. In that case, the second ratio ERa2(n, n+m(Z)) is calculated according to Expression (4-2).

[Math 4]

$$ERa2(n, n+m(z)) = \frac{\text{peak}(n+m(Z))}{\text{Peak}(n)} \quad (4)$$

[Math 4-2]

$$ERa2(n, n+m(z)) = \frac{\text{Max}(\text{peak}(n+m(Z))+\alpha, \beta)}{\text{Max}(Peak(n)+\alpha, \beta)} \quad (4\text{-}2)$$

The acquisition circuit 220A shown in FIG. 6 acquires a first evaluation value Ev(n, n+m(Z)) on the basis of either one of the first ratio ERa1(n, n+m(Z)) and the second ratio R2(n, n+m(Z)).

For example, as indicated by Expression (5), the acquisition circuit 220A acquires, on the basis of the first ratio ERa1(n, n+m(Z)) and the first cumulative value A, the first evaluation value Ev(n, n+m(Z)) indicating similarity between the first digital signal D(n) and the second digital signal (n+m(Z)).

[Math 5]

$$Ev(n,n+m(z))=F1(ERa1(n,n+m(z)),At(n)T)) \quad (5)$$

A function $F1(x)$ is a nonlinear function that, for example, shows a maximum value when "x" is 1 and shows a smaller value as a value of "x" further deviates from 1. Consequently, the first evaluation value Ev(n, n+m(Z)) shows a highest value when a ratio of the first cumulative value and the second cumulative value is 1 and shows a smaller value as the ratio further deviates from 1. As indicated by Expression (5), the first evaluation value Ev(n, n+m(Z)) calculated using the cumulative values is suitable for measurement processing in the daytime easily affected by environment light such as sunlight because the first evaluation value Ev(n, n+m(Z)) is less easily affected by random noise.

For example, as indicated by Expression (6), the acquisition circuit 220A may acquire the first evaluation value Ev(n, n+m(Z)) on the basis of the second ratio ERa2(n, n+m(Z)) and the first peak value Peak(n).

[Math 6]

$$Ev(n,n+m(z))=F1(ERa2(n,n+m(z)),\text{Peak}(n)) \quad (6)$$

That is, the first evaluation value Ev(n, n+m(Z)) shows a highest value when a ratio of the first peak value Peak(n) and the second peak value Peak(n+m(Z)) is 1 and shows a smaller value as the ratio further deviates from 1. As indicated by Expression (6), the first evaluation value Ev(n, n+m(Z)) calculated using the peak values is suitable for measurement processing at night without environment light when measurement accuracy of the peak values is higher.

Note that the first evaluation value Ev(n, n+m(Z)) is not limited to the second ratio ERa2(n, n+m(Z)) of the first peak value Peak(n) and the second peak value Peak(n+m(Z)) as long as the first evaluation value Ev(n, n+m(Z)) is a value indicating similarity between the first peak value Peak(n) and the second peak value Peak(n+m(Z)). For example, a ratio of the absolute value of a difference value between the first peak value Peak(n) and the second peak value Peak(n+m(Z)) and the first peak value Peak(n) may be set as the first evaluation value Ev(m, n+m(Z)). In this case, the first evaluation value Ev(n, n+m(Z)) shows a highest value when the ratio of the absolute value of the difference value between the first peak value Peak(n) and the second peak value Peak(n+m(Z)) and the first peak value Peak(n) is 0 and shows a smaller value as the ratio increases to a value larger than 0.

The acquisition circuit 220A may acquire the first evaluation value Ev(n, n+m(Z)) on the basis of the first ratio ERa1(n, n+m(Z)) and the second ratio ERa2(n, n+m(Z)). In this case, the first evaluation value Ev(n, n+m(Z)) shows a highest value as both of the first ratio ERa1(n, n+m(Z)) and the second ratio ERa2(n, n+m(Z)) are close to 1 and shows a lower value as either one of the ratios increases to a value larger than 1 or decreases to a value smaller than 1. In this way, the first evaluation value Ev(n, n+m(Z)) calculated using the cumulative values and the peak values is suitable for measurement processing in all time periods in the daytime and at night.

For example, as indicated by Expressions (7) to (9), the acquisition circuit 220A generates a weight value W(n, n+m(Z)) between the first digital signal D(n) and the second digital signal D(n+m(Z)) on the basis of the first evaluation value Ev(n, n+m(Z)). That is, Expression (7) indicates the weight value W(n, n+m(Z)) generated using the first ratio ERa1(n, n+m(Z)). Expression (8) indicates the weight value W(n, n+m(Z)) generated using the second ratio ERa2(n, n+m(Z)). Expression (9) indicates the weight value W(n, n+m(Z)) generated using the first ratio ERa1(n, n+m(Z)) and the second ratio ERa2(n, n+m(Z).

[Math 7]

$$W(n,n+m(z))=F2(Ev(n,n+m(z)))=F2(F1(ERa1(n,n+m(z)))) \quad (7)$$

[Math 8]

$$W(n,n+m(z))=F2(Ev(n,n+m(z)))=F2(F1(ERa2(n,n+m(z)))) \quad (8)$$

[Math 9]

$$W(n,n+m(z))=F2(Ev(n,n+m(z)))=F2(F3(ERa1(n,n+m(z)),ERa2(n,n+m(z)))) \quad (9)$$

Note that, when the first ratio ERa1(n, n+m(Z)) is calculated by Expression (3) or Expression (3-2), a standard deviation, dispersion, an amplitude value, an integration value of the absolute value of a difference from an average, and the like, which are signals representing an S/N ratio of a digital signal may be used instead of the cumulative value. That is, the acquisition circuit 220A may calculate, as a first calculation value, any one of a standard deviation, dispersion, an amplitude value, an integration value of the absolute value of a difference from an average, and the like, which are signals representing an S/N ratio in a first digital signal predetermined period, calculate, as a second calculation value, any one of a standard deviation, dispersion, an amplitude value, an integration of the absolute value of a difference from an average, and the like, which are signals representing an S/N ratio in a second digital signal predetermined period, and generate a weight value of a second digital signal on the basis of a ratio of the first calculation value and the second calculation value.

A function $F2(x)$ is, for example, a monotone increasing function. For example, a maximum value of the Function $F2(x)$ is 1.0 and a minimum value of the Function $F2(x)$ is 0. $F3(x1, x2)$ is a binary function of the first ratio ERa1(n, n+m(Z)) and the second ratio ERa2(n, n+m(Z)) and is a function, a value of which is larger as both of the first ratio ERa1(n, n+m(Z)) and the second ratio ERa2(n, n+m(Z)) are closer to 1 and the value of which is smaller as any one ratio of the first ratio ERA1(n, n+m(Z)) and the second ratio ERa2(n, n+m(Z)) increases to a value larger than 1 or decreases to a value smaller than 1. In this way, the acquisition circuit 220A generates, as a larger value, the weight value W(n, n+m(Z)) of the second digital signal D(n+m(Z)) having high similarity to the first digital signal D(n).

When the first ratio $ERa1(n, n+m(Z))$ or the second ratio $ERa2(n, n+m(Z))$ used for the acquisition of the first evaluation value $Ev(n, n+m(Z))$ exceeds a predetermined range, the acquisition circuit 220A sets a weight value to 0. That is, a second digital signal having a weight value 0 is not accumulated. Consequently, it is possible to prevent the influence of a digital signal having a large difference in characteristics. Note that the first evaluation value $Ev(n, n+m(Z))$ according to this embodiment is acquired on the basis of a ratio of cumulative values, a ratio of peak values, and the like in a predetermined time range. However, the first evaluation value $Ev(n, n+m(Z))$ is not limited to the ratio of cumulative values, the ratio of peak values, and the like and only has to be a numerical value indicating similarity between digital signals. Note that the first evaluation value $Ev(n, n+m(Z))$ or the like indicating similarity between the first and second digital signals may be processed by another calculation circuit or CPU.

As indicated by the following Expression (6), the accumulation circuit 220B accumulates, on the first digital signal $D(n)$, a signal obtained by weighting the second digital signal $D(n+m(Z))$ with the weight value $W(n, n+m(Z))$ and generates a third digital signal $Ad(n)$. As explained above, "M" indicates the number of second irradiation directions adjacent to a first irradiation direction,

[Math 10]

$$Ad(n) = D(n) + \sum_{Z=0}^{Z=M-1} W(n, n+m(z)) \times D(n+m(Z)) \quad (10)$$

[Math 11]

$$W(n+m(Z)), (0 \leq n < N, 0 \leq Z \leq (M-1)) \quad (11)$$

The acquisition circuit 220A outputs information concerning a weight value shown in Expression (11) to the distance measurement processing device 400. The information concerning the weight value can be used for generation of a reliability degree explained below.

First, a third digital signal obtained by accumulating second digital signals having high similarity to a first digital signal is explained with reference to FIGS. 12A to 12C. FIGS. 12A to 12C are diagrams schematically showing the first digital signal DE and the second digital signal DA (FIG. 8A) are subjected to weighted accumulation.

FIG. 12A schematically shows the first digital signal DE obtained on the basis of the reflected light L2 from the measurement target object 10. FIG. 12B schematically shows the second digital signal DA obtained on the basis of the reflected light L2 from the measurement target object 10. FIG. 12C schematically shows a third digital signal obtained by subjecting the first digital signal DE and the second digital signal DA to weighted accumulation. Since the first digital signal DE and the second digital signal DA have high similarity, a value close to the maximum value 1.0 is given as a weight value.

As shown in FIG. 12C, the reflected light L2 from the measurement target object 10 is sampled at substantially the same sampling timing. Therefore, the intensity of a signal is increased by accumulating the reflected light L2. On the other hand, random noise such as sunlight and irregularly reflected light has no reproducibility. Therefore, the random noise is relatively reduced by accumulation compared with the reflected light L2 from the measurement target object 10.

A signal value S12 indicates a value at a point in time corresponding to a measured distance of an accumulated time-series digital signal.

A third digital signal obtained by accumulating a second digital signal having low similarity is accumulated on a first digital signal is explained with reference to FIGS. 13A to 13C. FIGS. 13A to 13C are diagrams schematically showing weighted accumulation of the second digital signal DD (FIG. 8B) on the first digital signal DE. FIG. 13A schematically shows the first digital signal DE obtained on the basis of reflected light from the measurement target object 10. FIG. 13B schematically shows the second digital signal DD obtained on the basis of reflected light reflected from an object different from the measurement target object 10. Since similarity between the first digital signal DE and the second digital signal DD is low, for example, a value close to the minimum value 0 is given as a weight value.

In this way, the acquisition circuit 220A generates, on the basis of similarity between a first digital signal obtained by digitizing reflected light of laser light irradiated in a first irradiation direction and a second digital signal obtained by digitizing reflected light of laser light irradiated in a second irradiation direction different from the first irradiation direction, a weight value of the second digital signal. Consequently, the acquisition circuit 220A can increase the weight value of the second digital signal when the similarity is high. By accumulating the weighted second digital signal on the first digital signal to generate a third digital signal, it is possible to accurately and stably measure the distance to a target object on the basis of a time difference between timing of a peak position in the third digital signal and irradiation timing of the laser light without being affected by noise.

Figure 14:
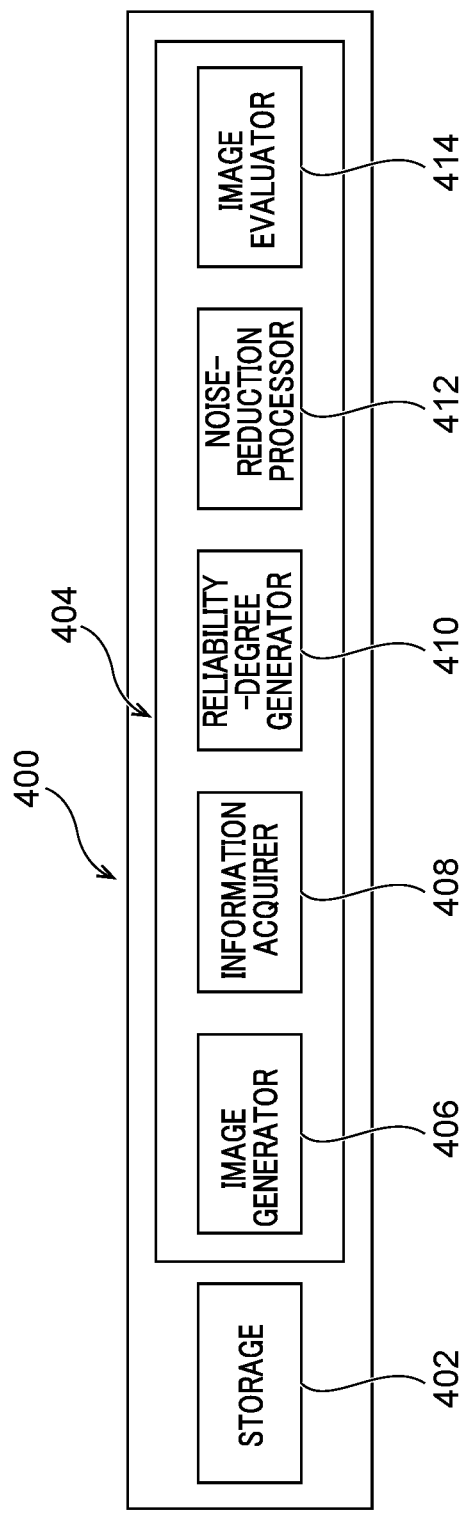
FIG. 14 is a diagram showing a detailed configuration of a distance measurement processing device.

A detailed configuration of the distance measurement processing device 400 is explained with reference to FIG. 14. FIG. 14 is a diagram showing the detailed configuration of the distance measurement processing device 400. As shown in FIG. 14, the distance measurement processing device 400 is a device capable of performing noise reduction processing. The distance measurement processing device 400 includes a storage circuit 402 and an image processing circuit 404.

As explained above, "n" of the third digital signal $Ad(n)$ ($0 \leq n < N$) indicates the order of the irradiation of the laser light $L1(n)$. A measured distance $Dis(n)$ ($0 \leq n < N$) obtained on the basis of the third digital signal $Ad(n)$ ($0 \leq n < N$) is represented as $D_i$ ($0 \leq i < N$). $D_i$ ($0 \leq i < N$) indicates a pixel value forming a two-dimensional distance image. That is, the order n of measurement according to this embodiment corresponds to order i of a pixel forming the distance image.

Similarly, a signal value at a peak time of the third digital signal $Ad(n)$ ($0 \leq n < N$) corresponding to the pixel value $Di$ ($0 \leq i < N$) indicating the measured distance is represented as $Li$ ($0 \leq i < N$). Similarly, the weight value $W$ ($n+m(Z)$), ($0 \leq n < N$, $0 \leq Z \leq (M-1)$) shown in Expression (11) is represented by a weight value $W(i, j)$, ($0 \leq i < N$, $j \in A$) corresponding to the distance image. "A" means a predetermined range A from a center pixel MP shown in FIG. 16 explained below. For example, representation $W(i, j)$, $j \in A$ indicates a weight value between a pixel i and a pixel j and j means a pixel in the predetermined range A from the center pixel i.

The storage circuit 402 is realized by, for example, a semiconductor memory element such as a RAM (Random Access Memory) or a flash memory, a hard disk, or an optical disk. The storage circuit 402 stores information supplied from the measurement circuit 300.

The storage circuit 402 acquires, from the measurement circuit 300, the pixel value $Di$ ($0 \leq i < N$) indicating the measured distance, the signal value Li (0≤i<N) corresponding to the measured distance Di, and the weight value W(i, j), (0≤i<N, j∈A) used to accumulate the third digital signal Ad(i) (0≤i<N) and stores the values. To simplify explanation, in the following explanation, one distance value (referred to as return) is output for one pixel. Usually, a plurality of distance values are output for one pixel To output the plurality of distance values for one pixel, i only has to be simply expanded by regarding i as an identifier for a combination of the pixel and the distance value.

The image processing circuit 404 includes an image generation circuit 406, an image acquisition circuit 408, a reliability-degree generation circuit 410, a noise-reduction processing circuit 412, and an image evaluation circuit 414.

The image generation circuit 406 generates, on the basis of the information stored in the storage circuit 402, a two-dimensional distance image having the measured distance Di (0≤i<N) as a pixel value and information concerning the signal value Li (0≤i<N) associated with each of pixels of the two-dimensional distance image and outputs the two-dimensional distance image and the information to the storage circuit 402.

The information acquisition circuit 408 acquires, from the storage circuit 402, the two-dimensional distance image having the measured distance Di (0≤i<N) as the pixel value and the information concerning the signal value Li (0≤i<N) associated with each of pixels of the two-dimensional distance image. The information acquisition circuit 408 acquires the weight value W(i, j), (0≤i<N, j∈A) from the storage circuit 402. The information acquisition circuit 408 may acquire information concerning a two-dimensional distance image, a signal value associated with each of pixels of the two-dimensional distance image, and a weight value from another device via a network.

The reliability-degree generation circuit 410 generates a reliability degree for each of the pixels of the two-dimensional distance image. For example, as a value of the reliability degree decreases, the pixel is more likely to be noise. In other words, as the value of the reliability degree increases, the pixel is more likely not to be noise.

Figure 15A:
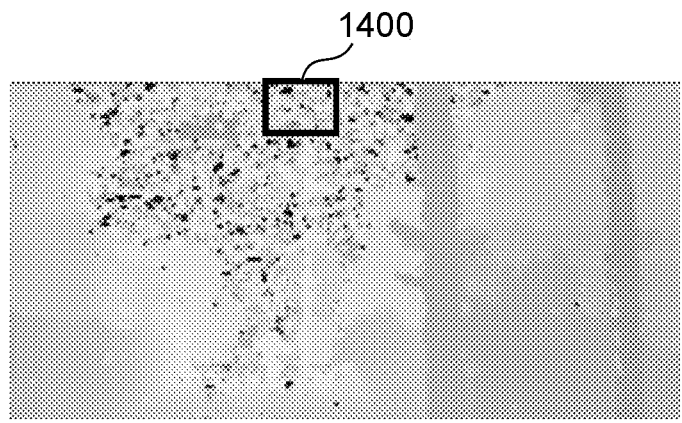
FIG. 15A is a diagram showing an example of a two-dimensional distance image.

FIG. 15A is a diagram showing an example of the two-dimensional distance image. A region 1400 indicates a noise region such as empty. Distance information is indicated by light and shade.

Figure 15B:
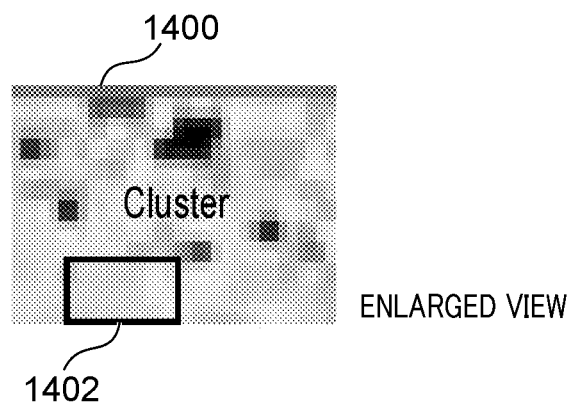
FIG. 15B is an enlarged view of a region 1400.

FIG. 15B is an enlarged view of the region 1400. A region 1402 is a region where noise is clustered. That is, the reliability-degree generation circuit 410 is capable of generating reliability degrees such that, for example, a reliability degree of such a region where noise is clustered is generally lower than a reliability degree of other regions that are not noise.

As shown in Expression (10) explained above, the third digital signal Ad(n) is generated by accumulating, on the digital signal D(n), the signal obtained by weighting the second digital signal D(n+m(Z)) (0≤Z≤(M−1)) with the weight value (n, n+m(Z)). "M" indicates the number of second irradiation directions adjacent to the first irradiation direction. Therefore, if noise NH having a strong luminance value in a range of the weight value W(n, n+m(Z)) (0≤Z≤(M−1)) indicated by "M" is present, the noise NH having the strong luminance value is added to a plurality of third digital signals Ad having the noise NH as an addition range. Consequently, a peak value due to the noise NH occurs in the plurality of third digital signals Ad. It is surmised that the peak value is measured as measured distances of the respective plurality of third digital signals Ad and clustering of noise occurs.

Figure 16:
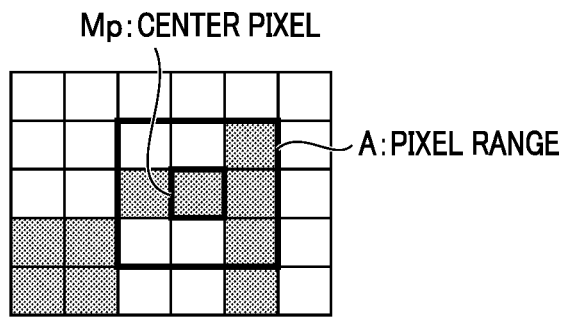
FIG. 16 is a diagram for explaining a pixel range for calculating a reliability degree.

FIG. 16 is a diagram for explaining a pixel range in which a reliability degree is calculated. As shown in FIG. 16, pixels in the pixel range A are used for generation of a reliability degree of the center pixel Mp. The pixel range A is a range of, for example, eight or twenty-four pixels adjacent to the center pixel Mp. That, the pixel range A is a range of pixels contiguous within a predetermined range from the center pixel Mp.

Figure 17:
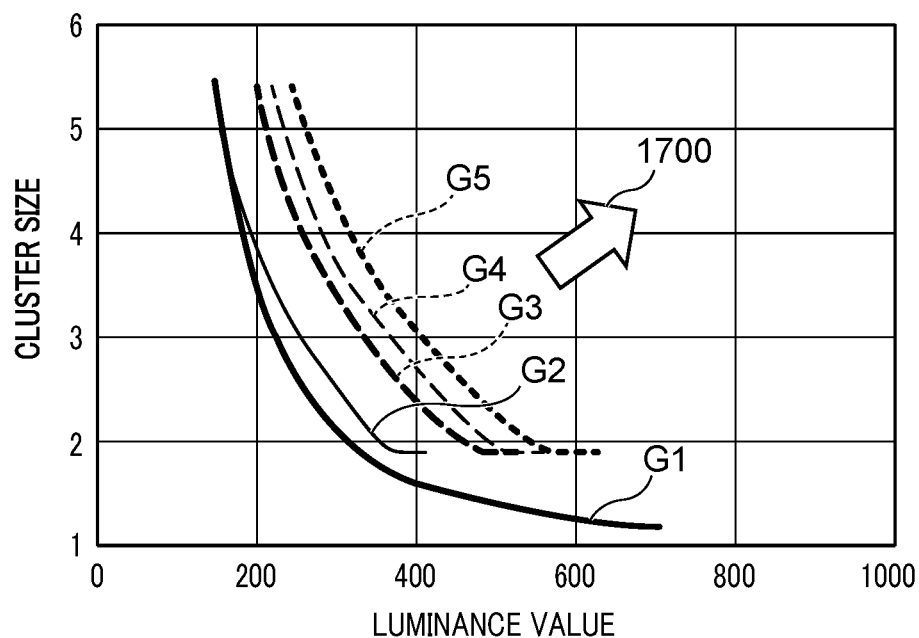
FIG. 17 is a diagram showing a relation between a cluster size and a luminance value and a success rate of distance measurement.

FIG. 17 is a diagram of a simulation result showing a relation between a cluster size and a luminance value and a success rate of distance measurement. The vertical axis indicates a cluster size and the horizontal axis indicates a luminance value. More in detail, a combination of a cluster size Ni and a signal value Li calculated by Expression (12) and Expression (13) explained below is calculated for all pixels i (0≤i≤N, "N" is a total number of pixels) of a two-dimensional distance image. In the diagram, a rate of the pixels i (0≤i≤N, "N" is a total number of pixels), which correspond to the combination, having true distance values is indicated as a distance measurement success rate.

For example, G5 is a line of 90% of the distance measurement success rate, G4 is a line of 80% of the distance measurement success rate, and G2 is a line of 0% of the distance measurement success rate. A line G1 is a line of a square of the signal value L×N=a constant. The line G1 coincides with tendencies of the lines G2 to G5. 0% corresponds to absence of a measurable object (e.g., empty).

A combination of the cluster size and the luminance on the line G5 indicates that unlikelihood of noise is 90%. A combination of the cluster size and the luminance on the line G4 indicates that unlikelihood of noise is 80%. A combination of the cluster size and the luminance on the line G3 indicates that unlikelihood of noise is 70%. A combination of the cluster size and the luminance on the line G2 indicates that unlikelihood of noise is 0%. As indicated by an arrow 1700 in FIG. 17, the distance measurement success rate increases toward the upper right. It is seen that the reliability degree increases as the magnitudes of the luminance and the cluster size increase.

[Math 12]

$$p(i,j):|D_j-D_i|\le k \quad (12)$$

P(i, j) indicates 1 if the absolute value of a difference between a distance $D_j$ of a pixel j and a distance $D_i$ of a pixel i is "k" or less and indicates 0 if the absolute value is larger than "k". For example, "k" is 2 meters.

[Math 13]

$$N_i = \Sigma_{j\in A} p(i,j) \quad (13)$$

As shown in Expression (13), "$N_i$" indicates the number of pixels having a distance value $D_i$ of a center pixel i and a distance value $D_j$ in a predetermined range K among pixels in a predetermined range A (FIG. 16) from the center pixel i. That is, "$N_i$" indicates the number of pixels having the distance value $D_j$ equal to or smaller than a predetermined value K from the distance value Di of the center pixel i. The pixel $N_i$ is called cluster size.

The reliability-degree generation circuit 410 generates a first reliability degree $R1_i$ (0≤i<N) of the pixel i. More in detail, as shown in Expression (14), the first reliability degree $R1_i$ (0≤i<N) of the pixel i is a value obtained by multiplying the signal value $L_i$(0≤i<N) of the center pixel i by a square root of the number of pixels $N_i$ indicated by Expression (13). That is, the first reliability degree $R1_i$ of the pixel i is a value based on the distance value $D_i$ of the center pixel i among, for example, eight adjacent pixels in the predetermined range A from the center pixel i, the number of pixels $N_i$ having the distance $D_j$ in the predetermined range k (Expression (12)), and the signal value $L_i$ corresponding to the center pixel i.

"$L_i$" is a value of the signal value Li itself associated with the pixel i when a plurality of digital data are not accumulated in the third digital signal Ad(i) (0≤i<N) used for the measurement of the measured distance explained above.

On the other hand, when a plurality of digital data are accumulated in the third digital signal Ad(i) (0≤i<N), the signal value $L_i$ is calculated by Expression (15) or Expression (16). Expression (15) indicates a value obtained by respectively adding up values, which are obtained by multiplying signal values $L_j$ associated with pixels in the pixel range A by P(i, j) indicated by Expression (12), and dividing an added-up value by "$N_i$" indicated by Expression (13). In this case, "A", which is a predetermined range from the center pixel i shown in Expression (13), coincides with, for example, a range of a digital signal obtained by accumulating the third digital signal Ad(i) (0≤i<N), that is, the range A of the weight value W(i, j), (0≤i<N, j∈A).

Consequently, the reliability degree $R1_i$ (0≤i<N) obtained by substituting Expression (15) in Expression (14) is a value obtained by dividing, by the number of pixels $N_i$, an added-up value, which is obtained by respectively adding up the distance value $D_i$ of the center pixel i among the pixels in the predetermined range A from the center pixel i and the signal value $L_j$ corresponding to the pixel j having the distance value $D_j$ in the predetermined range k (Expression (12)), and further multiplying a divided value by a square root of the number of pixels $N_i$.

As shown in Expression (16), "$L_i$" and "$N_i$" may be further multiplied by a coefficient C(i, j). Consequently, the reliability degree $R1_i$ obtained by substituting Expression (16) in Expression (14) is a value obtained by dividing an added-up value, which is obtained by respectively adding up multiplied values obtained by multiplying, by a predetermined coefficient C(i, j), the distance value $D_i$ of the center pixel i among the pixels in the predetermined range A from the center pixel i and the signal value $L_j$ corresponding to the pixel j having the distance value $D_j$ in the predetermined range k (Expression (12)), by an added-up value, which is obtained by respectively adding up the predetermined coefficient C(i, j) multiplying the signal value $L_j$, and further multiplying a divided value by a square root of the number of pixels $N_i$.

FIG. 18 is a diagram showing an arrangement pattern example of the coefficient C(i, j). A coefficient of the center pixel i is indicated by "11b". A coefficient of peripheral pixels in the addition range A is indicated by "01b". For example, the coefficient 11b is 1. The coefficient 01b is selected out of 1, ½, ¼, and the like.

[Math 14]

$$R1_i = L_i \times \sqrt{N_i} \qquad (14)$$

[Math 15]

$$L_i = [\Sigma_{j \in A} L_j \times p(i,j)] / [\Sigma_{j \in A} p(i,j)] \qquad (15)$$

[Math 16]

$$L_i = [\Sigma_{j \in A} L_j \times p(i,j) \times c(i,j)] / [\Sigma_{j \in A} p(i,j) \times c(i,j)] \qquad (16)$$

[Math 17]

$$R2_i = [\Sigma_{j \in A} L_j^2 \times p(i,j) \times c(i,j)]^{1/2} \qquad (17)$$

The reliability-degree generation circuit 410 generates a reliability degree $R2_i$. As shown in Expression (17), the second reliability degree $R2_i$ (0≤i<N) is a value based on an added-up value obtained by respectively adding up powers of the distance Di of the center pixel i among the pixels in the predetermined range A from the center pixel i and the signal value $L_j$ corresponding to the pixel j having the distance value $D_j$ in the predetermined range k (Expression (12)). More specifically, the second reliability degree $R2_i$ is a value based on an added-up value obtained by respectively adding up values obtained by multiplying, by the predetermined coefficient C(i, j), powers of the distance $D_i$ of the center pixel i among the pixels in the predetermined range A from the center pixel i and the signal value L, corresponding to the pixel j having the distance value $D_j$ in the predetermined range k (Expression (12)).

FIG. 19 is a diagram showing an arrangement pattern example of a value of C(i, j) used for the second reliability degree $R2_i$. A coefficient of the center pixel i is indicated by "11b". A coefficient of peripheral pixels in the addition range A is indicated by "01b". For example, the coefficient 11b is 1. The coefficient 01b is selected out of 1, ½, ¼, and the like. "00b" is 0. A coefficient is of a pixel corresponding to a digital signal not added is set to 0 with reference to the weight value W(i, j), (0≤i<N, j∈A). For example, the pattern of the coefficient shown in FIG. 18 may be multiplied by the weight value W(i, j), (0≤i<N, j∈A) to obtain a pattern of a coefficient.

[Math 18]

$$R0_i = L_i \qquad (18)$$

As shown in Expression (18), a third reliability degree $R0_i$ of the pixel i is the signal value Li of the center pixel i.

As shown in FIG. 14, the noise-reduction processing circuit 412 performs noise reduction processing for a distance image using the first reliability degree $R1_i$ (0≤i<N) and the second reliability degree $R2_i$ (0≤i<N). The noise-reduction processing circuit 412 determines, for example, a threshold of 1% of a failure rate of noise reduction on the basis of a result in a period of time when reflected light of laser does not reach. The noise-reduction processing circuit 412 sets the threshold to the first reliability degree $R1_i$ (0≤i<N) or the second reliability degree $R2_i$ (0≤i<N) and removes pixels having reliability degrees equal to or smaller than the threshold as noise. In processing of the noise-reduction processing circuit 412 according to this embodiment, only selection and discarding of data are performed. Therefore, it is unlikely that actually absent data is generated. It is possible to perform noise reduction processing with higher security.

The image evaluation circuit 414 evaluates the quality of an image. The image evaluation circuit 414 generates, as an image evaluation value of a distance image, an average of the first reliability degree R1i (0≤i<N) and the second reliability degree R2i (0≤i<N) of evaluation positions of the pixels i (0≤i≤N, "N" is a total number of pixels) forming the distance image. It is possible to objectively evaluate the quality of the distance image with the image evaluation value.

Figure 20A:
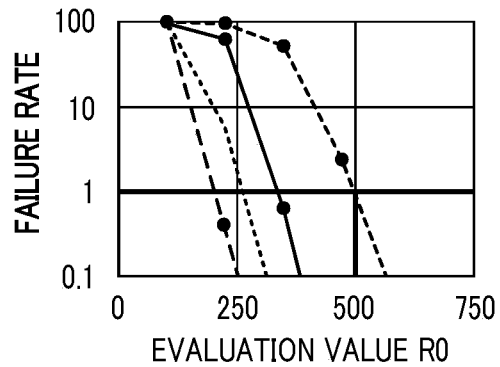
FIGS. 20A to 20C are diagrams showing relations between reliability degrees and a failure rate 1% line.
Figure 20B:
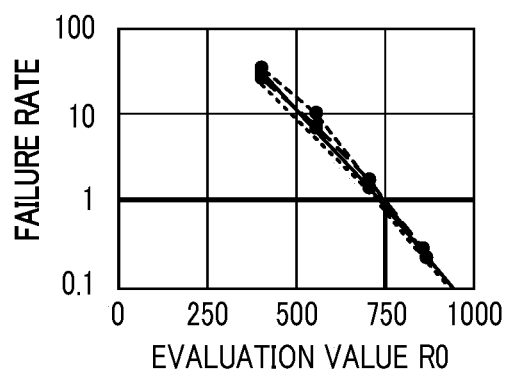
Figure 20C:
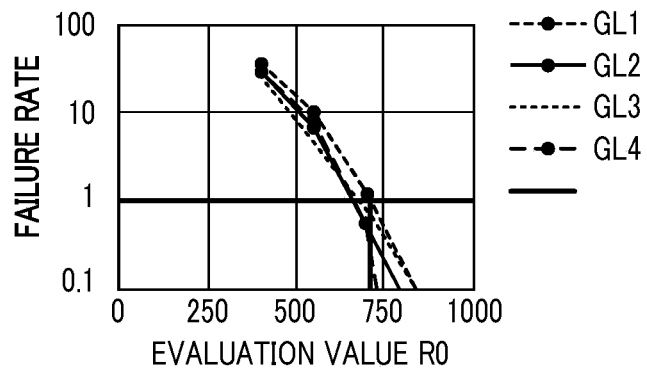

FIGS. 20A to 20C are diagrams showing relations between the reliability degrees and a failure rate 1% line. FIG. 20A shows a relation between the third reliability degree R0 (Expression (18)) and the failure rate 1% line. FIG. 20B shows a relation between the first reliability degree R1 (Expression (14)) and the failure rate 1% line. FIG. 20C shows a relation between the second reliability degree R2

(Expression (17)) and the failure rate 1% line. The horizontal axis indicates a value of a reliability degree. The vertical axis indicates a failure rate. The failure rate 1% line is a line indicating that 99% of pixels removed as noise is noise. That is, the failure rate 1% line is equivalent to a threshold in performing 99% denoising. "GL1" indicates the failure rate 1% line of a four pixel average. "GL2" indicates the failure rate 1% line of a nine pixel average. "GL3" indicates the failure rate 1% line of a sixteen pixel average. "GL4" indicates the failure rate 1% line of a twenty-five pixel average.

As shown in FIG. 20A, when the third reliability degree R0 is used, a value of the failure rate 1% line fluctuates depending on an averaged number of pixels. In other words, the third reliability degree R0 is affected by clustering. The third reliability degree R0 indicates so-called reliability.

On the other hand, it is seen that the first reliability degree R1 and the second reliability degree R2 do not depend on the width of an integration range of a digital signal for measurement, that is, the strength of averaging, which is a cause of clustering. When the integration range is set to 1, for example, an accumulation range of the third digital signal Ad(n) is 1, that is, the third digital signal Ad(n) is not accumulated, the first reliability degree R1 and the second reliability degree R2 coincide with the third reliability degree R0.

Figure 21:
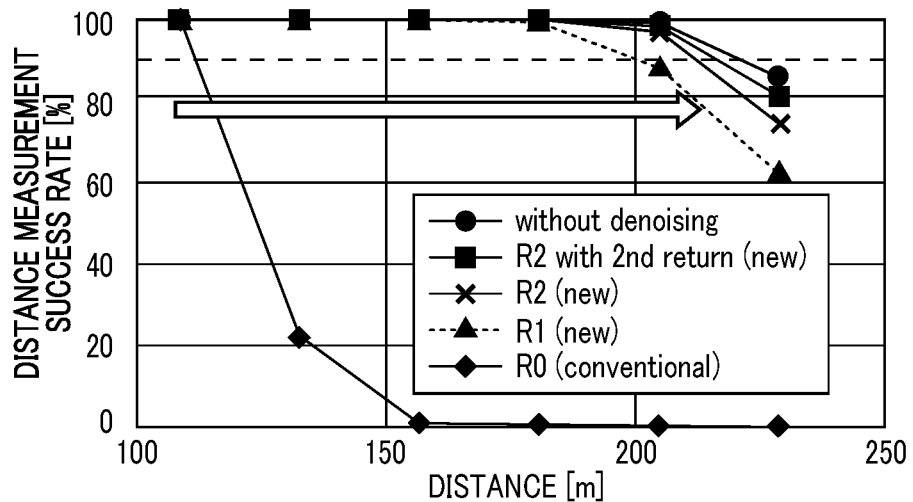
FIG. 21 is a diagram showing a distance measurement success rate of a result of performing denoising of 99% on the basis of a reliability degree.

FIG. 21 is a diagram showing a distance measurement success rate of a result of performing denoising of 99% on the basis of a reliability degree. The vertical axis indicates a distance measurement success rate. The horizontal axis indicates a measured distance. A circle of a solid line indicates a distance measurement success rate obtained when the third reliability degree R0 is used. A triangle of a dotted line indicates a distance measurement success rate obtained when the first reliability degree R1 is used. A square of a solid line indicates a distance measurement success rate obtained when the second reliability degree R2 is used. A larger square of a solid line indicates a distance measurement success rate obtained when the second reliability degree R2 by a second return is used. A circle of a dotted line indicates a distance measurement success rate obtained when denoising is not performed. When a success rate of 90% is set as a distance measurable condition, it is seen that, when the first reliability degree $R1_i$ and the second reliability degree $R2_i$ are used, a distance measurable distance is approximately a double of a distance measurable when the reliability degree R0 is used. The second return means a second largest peak signal of the third digital signal Ad(i) (Expression (10)). It is also possible to calculate the first reliability degree R1 and the second reliability degree R2 using a distance value $D2_i$ ($0 \leq i < N$) and a signal value $L2_i$ ($0 \leq i < N$) by the second return.

Figure 22:
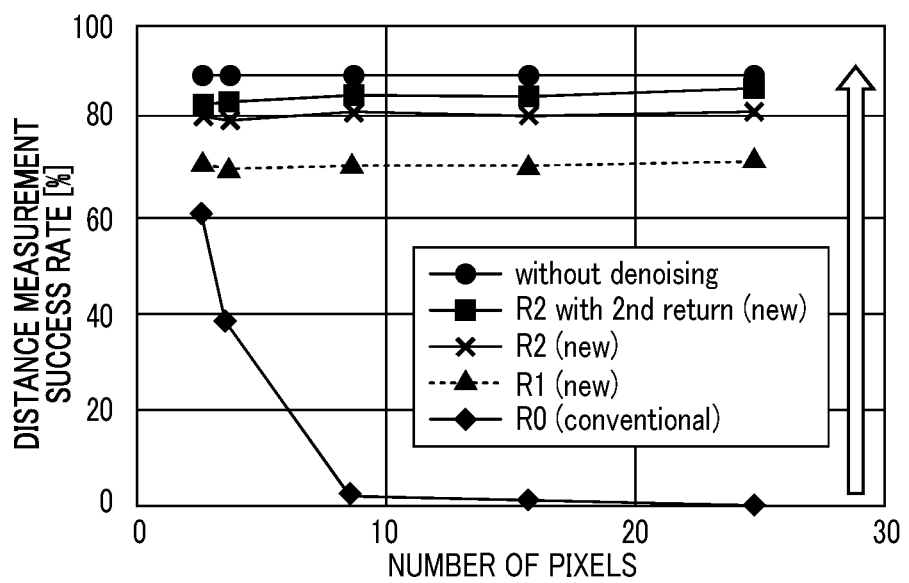
FIG. 22 is a diagram showing a distance measurement success rate after noise reduction processing is performed to remove noise.

FIG. 22 is a diagram showing a distance measurement success rate after the noise-reduction processing circuit 412 performs the noise reduction processing targeting a distance image having a success rate of 90% before noise reduction to remove noise. The vertical axis indicates a distance measurement success rate. The horizontal axis indicates the number of pixels in the pixel range A used to calculate the first reliability degree $R1_i$ and the second reliability degree $R2_i$. A circle of a solid line indicates a distance measurement success rate obtained when the third reliability degree R0 is used. A triangle of a dotted line indicates a distance measurement success rate obtained when the third reliability degree R1 is used. A square of a solid line indicates a distance measurement success rate obtained when the first reliability degree R2 is used. A larger square of a solid line indicates a distance measurement success rate obtained when the second reliability degree R2 by a second return is used. A circle of a dotted line indicates a distance measurement success rate obtained when denoising is not performed. When the denoising is not performed, since an original distance image is shown, the success rate is 90%. This indicates that pixels, which are not noise, among all pixels of a distance image are 90%.

As shown in FIG. 22, when compared with the noise reduction processing performed using the third reliability degree R3 set as a comparison target, the success rate is remarkably improved in the noise reduction processing performed using the first reliability degree R1 and the second reliability degree R2. It is possible to further improve the success rate by concurrently using the first reliability degree R1 and the second reliability degree R2 by the second return.

Figure 23C:
FIGS. 23A to 23D are diagrams of the noise reduction processing.
Figure 23D:
Figure 23A:
Figure 23B:
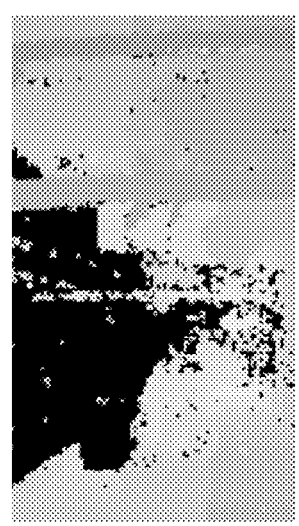

FIGS. 23A to 23D are diagrams of the noise reduction processing performed by the noise-reduction processing circuit 412. FIGS. 23A and 23C on the upper side show an example in which 99% denoising is performed using the third reliability degree R0. FIGS. 23B and 23D on the lower side show an example in which 99% denoising is performed using the first reliability degree R1. When the first reliability degree R1 is used, compared with when the third reliability degree R0 is used, it is seen that a distant object (a car, etc.) is clearly detected.

In this embodiment, the image processing circuit 404 is configured by, for example, a processor. The word "processor" means a CPU (Central Processing Unit), a GPU (Graphics Processing Unit), or a circuit such as an application specific integrated circuit (ASIC), a programmable logic device (e.g., a simple programmable logic device (SPLD), a complex programmable logic device (CPLD), a field programmable gate array (FPGA)) or the like. The processor reads out and executes programs saved in the storage circuit 402 to thereby realize the image generation circuit 406, the information acquisition circuit 408, the reliability-degree generation circuit 410, the noise-reduction processing circuit 412, and the image evaluation circuit 414. The programs may be directly incorporated in the circuit of the processor instead of being saved in the storage circuit 402. In this case, the processor reads out and executes the programs incorporated in the circuit to thereby realize the functions. The processor is not limited to a circuit of the processor alone. A plurality of independent circuits may be combined to configure one processor and realize functions of the circuits. Further, the plurality of components shown in FIG. 14 may be integrated into one processor to realize the functions of the components. The image generation circuit 406, the information acquisition circuit 408, the reliability-degree generation circuit 410, the noise-reduction processing circuit 412, and the image evaluation circuit 414 may be configured by independent circuits. The processing of the image processing circuit 404 according to this embodiment can be implemented as high-speed HW. Therefore, the processing of the image processing circuit 404 can be used for a highly emergent application such as obstacle detection. When the plurality of components shown in FIG. 14 are integrated into one processor, for example, the processor can be configured with a circuit size of 113 Kgates and power consumption of 15.8 mW (20 ch). In the case of 28 nm, if 1.2 $mm^2$/1484 Kgates (16 ch) is assumed to be 113 Kgates, the circuit size is 0.098 $mm^2$, for example, a substantial size of 3.1×2.9 mm.

The configuration according to this embodiment is as explained above. An operation example of the distance measuring system 2 according to this embodiment is explained in detail below.

Figure 24:
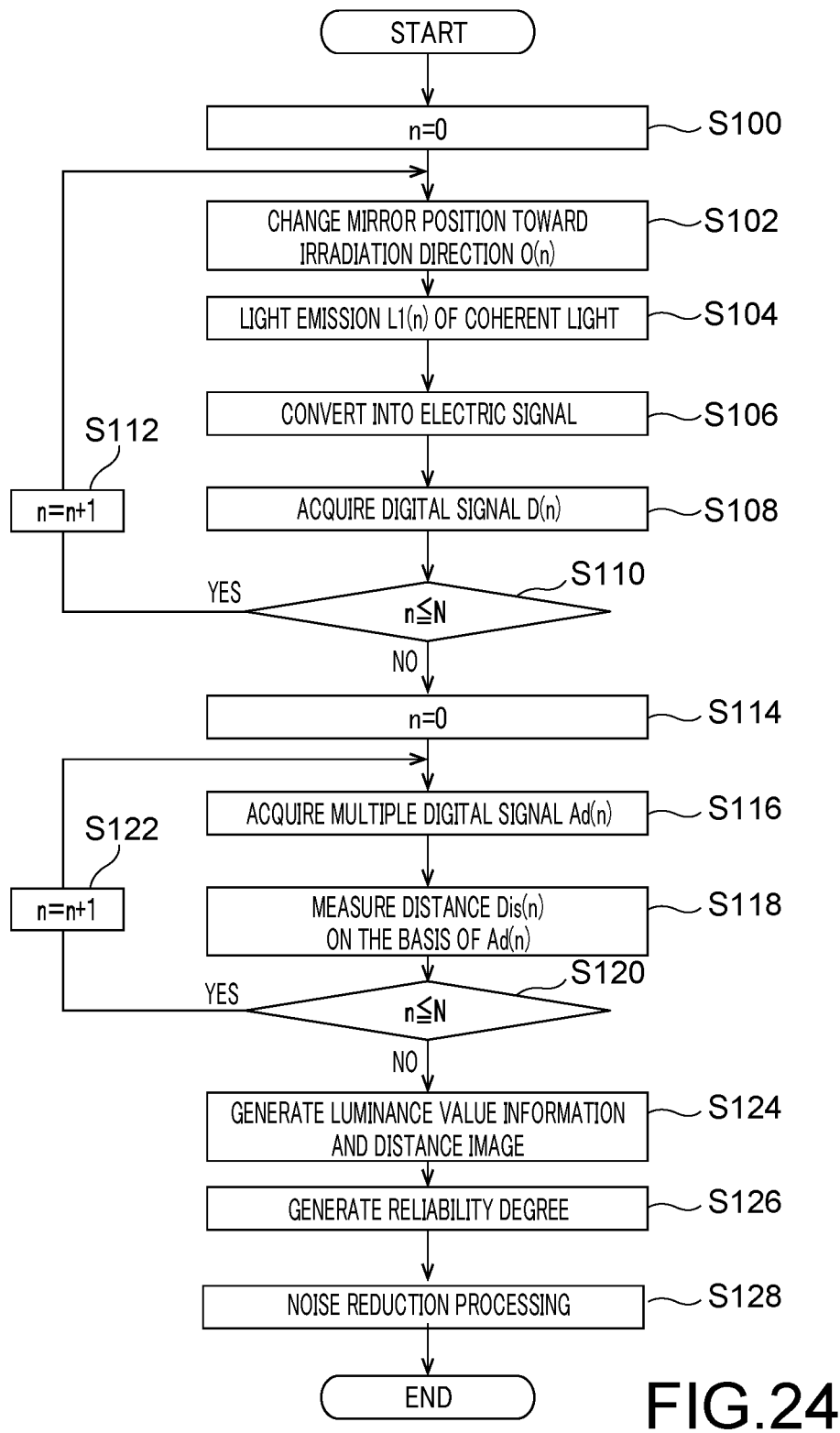
FIG. 24 is a flowchart for explaining a processing operation of a distance measuring system.

FIG. 24 is a flowchart for explaining a processing operation of the distance measuring system 2 according to this embodiment. An overall processing operation in the distance measuring device 5 and the distance measurement processing device 400 of the distance measuring system 2 is explained with reference to FIG. 24.

First, the control circuit 16 in the emission circuit 100 sets 0 in "n" and controls the second driving circuit 16a to change the position of the mirror 15 toward an irradiation direction O(n) (step 100 and 102).

The control circuit 16 controls the oscillator 11a and the first driving circuit 11b to emit the laser light L1(n) (step 104).

Subsequently, the reflected light L2(n) traveling along the optical axis O2 of the light-receiving optical system is received by the sensor 18 via the mirror 15, the second optical element 14, and the lens 18a and converted into an electric signal (step 106).

Subsequently, the AD conversion circuit 20 performs sampling of the electric signal corresponding to the reflected light L2(n). The control circuit 16 causes the storage circuit 21 to store, in time series, a digital signal D(n) associated with the irradiation direction O(n) (step 108).

Subsequently, the control circuit 16 determines whether "n" is equal to or smaller than "N" (step 110). When "n" is equal to or smaller than "N" (YES in step 110), the controller 16 adds 1 to "n" (step 108) and repeats the processing from step 102.

On the other hand, when "n" is larger than "N" (NO in step 110), the measurement processing circuit 22 sets 0 in "n" and acquires the third digital signal Ad(n) of the digital signal D(n) stored in the storage circuit 21 (steps 114 and 116). Subsequently, the measurement processing circuit 22 supplies the weight value W(n+m(Z)), (0≤Z≤(M−1)) to the distance measurement processing device 400.

Subsequently, the measurement processing circuit 22 measures a distance Dis(n) to the measurement target object 10 in the irradiation direction O(n) based on the third digital signal Ad(n) and supplies the distance Dis(n) and a luminance signal L(n) of a peak value to the distance measurement processing device 400 (step S118).

Subsequently, the measurement processing circuit 22 determines whether "n" is equal to or smaller than "N" (step 102). When "n" is equal to or smaller than "N" (YES in step 120), the measurement processor 22 adds 1 to "n" (step 122) and repeats the processing from step 116.

On the other hand, when "n" is larger than "N" (NO in step S120), the image generation circuit 406 of the distance measurement processing device 400 supplies, on the basis of the distance Dis(n) and the luminance signal L(n) (0≤n≤N) acquired from the storage circuit 402, a two-dimensional distance image and signal information associated with information concerning the luminance signal L(n) as a signal corresponding to the pixels n of the two-dimensional image to the storage circuit 402 (step S124).

Subsequently, the information acquisition circuit 408 acquires the two-dimensional distance image, the luminance signal L(n) (0≤n≤N) corresponding to the pixels n of the two-dimensional distance image, and the weight value W(n+m(Z)), (0≤n<N, 0≤Z≤(M−1)) from the storage circuit 402 and supplies the two-dimensional distance image, the luminance signal L(n), and the weight value W(n+m(Z)) to the reliability-degree generation circuit 410. The reliability-degree generation circuit 410 generates the first reliability degree R1(n) and the second reliability degree R2(n) on the basis of Dis(n) (0≤n≤N), which is a pixel value of a two-dimensional distance image, the luminance signal L(n) (0≤n≤N), and the weight value W(n+m(Z)), (0≤n<N, 0≤Z≤(M−1)) (step S126). $R1_i$ (0≤i<N) is represented as R1(n) (0≤n<N) and $R2_i$ (0≤i<N) is represented as R2(n) (0≤n<N).

Subsequently, the noise-reduction processing circuit 412 performs processing for reducing, that is, removing noise from the distance image using one of the first reliability degree R1(n) and the second reliability degree R2(n) (step S128) and ends the entire processing.

In this way, first, the distance measuring device 5 performs sampling of the digital signal D(n) (0≤n≤N) of the laser light L1(n) (0≤n≤N). Thereafter, the distance measuring device 1 measures, while acquiring the third digital signal Ad(n) (0≤n≤N), which is a weighted cumulative value of the digital signal D(n) (0≤n≤N), the distance Dis(n) (0≤n≤N) based on Ad(n) (0≤n≤N). The reliability-degree generation circuit 410 of the distance measurement processing device 400 generates the first reliability degree R1(n) and the second reliability degree R2(n) on the basis of the distance Dis(n) (0≤n≤N), the luminance signal L(n) (0≤n≤N), and the weight value W (n+m(Z)), (0≤n<N, 0≤Z≤(M−1)). The noise-reduction processing circuit 412 reduces noise from the distance image using one of the first reliability degree R1(n) and the second reliability degree R2(n).

As explained above, with the distance measurement processing device 400 according to this embodiment, the reliability-degree generation circuit 410 set, for each of the pixels i of the two-dimensional distance image, each of the pixels i as the center pixel and generates the reliability degrees R1 and R2 based on the distance value $D_j$ of the center pixel i among the pixels j in the predetermined range A from the center pixel i, the number of pixels Ni of the pixel j having distance values in the predetermined range k, and the signal value Li corresponding to the center pixel i. Consequently, it is possible to more accurately generate a reliability degree of each of the pixels in the two-dimensional distance image including clustered noise.

(First Modification of the Embodiment)

Figure 25:
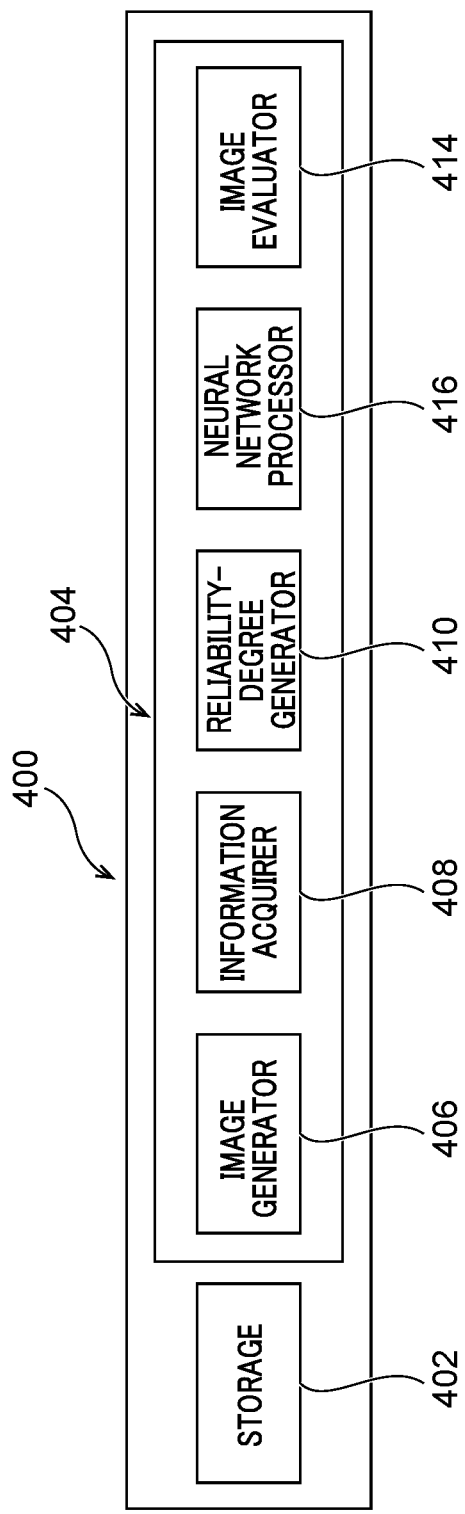
FIG. 25 is a diagram showing the configuration of a distance measurement processing device according to a first modification.

A first modification of the embodiment is different from the embodiment in that a neural network is used for the noise reduction processing. FIG. 25 is a diagram showing the configuration of a distance measurement processing device 400B according to the first modification. The first modification is different from the embodiment in that the distance measurement processing device 400 includes a neural-network processing circuit 416 instead of the noise-reduction processing circuit 412.

The neural-network processing circuit 416 is a neural network (DNN) that performs learning by so-called deep learning. A distance image, in which the position of noise is known, and data of one of the first reliability degree R1 and the second reliability degree R2 are given to the DNN as input data. A noise position is given to the DNN as a correct answer and learned by the DNN.

The neural-network processing circuit 416 outputs the distance image generated by the image generation circuit. The neural-network processing circuit 416 outputs the position of noise when one of the first reliability degree R1 and the second reliability degree R2 generated by the reliability-degree generation circuit is input. The neural-network processing circuit 416 outputs the distance image applied with the noise reduction processing.

As explained above, the noise reduction processing is performed by the DNN to which the distance image, in which the position of noise is known, and data of the reliability degree of the distance image are given as the input data and the noise position is given as the correct answer, which is learned by the DNN. Consequently, it is possible to perform the noise reduction processing without setting a threshold of a reliability degree.

Several embodiments of the present invention are explained above. However, these embodiments are presented as examples and are not intended to limit the scope of the invention. These new embodiments can be carried out in other various forms. Various omissions, substitutions, and changes can be made without departing from the spirit of the invention. These embodiments and the modifications thereof are included in the scope and the gist of the invention and included in the inventions described in the claims and a scope of equivalents of the inventions.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A distance measurement processing device comprising:
an information acquisition circuit configured to acquire a two-dimensional distance image having a measured distance as a pixel value and signal information concerning a signal value corresponding to the measured distance for each of pixels in the two-dimensional distance image; and
a reliability-degree generation circuit configured to set, for each of the pixels of the two-dimensional distance image, each of the pixels as a center pixel and generate a reliability degree based on information concerning the pixels having distance values equal to or smaller than a predetermined value from a distance value of the center pixel among the pixels contiguous within a predetermined range from the center pixel and a signal value corresponding to the center pixel.

2. The distance measurement processing device according to claim 1, wherein the reliability degree is a value obtained by multiplying the signal value of the center pixel by a square root of a number of pixels of the pixels having the distance values within the predetermined range from the distance value of the center pixel.

3. The distance measurement processing device according to claim 1, wherein the reliability degree is a value obtained by dividing an added-up value, which is obtained by respectively adding up the signal values corresponding to the pixels having the distance values within the predetermined range by a number of pixels of the pixels having the distance values within the predetermined range from the distance value of the center pixel, and further multiplying a divided value by a square root of the number of pixels.

4. The distance measurement processing device according to claim 1, wherein the reliability degree is a value obtained by dividing an added-up value, which is obtained by respectively adding up multiplied values obtained by multiplying the signal values corresponding to the pixels having the distance values within the predetermined range by a predetermined coefficient, by an added-up value, which is obtained by adding up the predetermined coefficient multiplying the signal values, and further multiplying a divided value by a square root of the number of pixels of the pixels having the distance values within the predetermined range.

5. The distance measurement processing device according to claim 1, wherein the reliability degree is based on an added-up value obtained by respectively adding up powers of the signal values corresponding to the pixels having the distance values within the predetermined range.

6. The distance measurement processing device according to claim 1, wherein the reliability degree is based on an added-up value obtained by respectively adding up values obtained by multiplying, by a predetermined coefficient, powers of the signal values corresponding to the pixels having the distance values within the predetermined range.

7. The distance measurement processing device according to claim 6, wherein
the signal value is a value at a point in time corresponding to the measured distance of a time-series digital signal obtained by accumulating a plurality of time-series digital signals on the basis of a weight value, and
the coefficient is a value based on the weight value.

8. The distance measurement processing device according to claim 5, wherein the reliability degree is based on a square root of the added-up value.

9. The distance measurement processing device according to claim 1, further comprising a noise-reduction processing circuit configured to perform noise reduction processing on the basis of the reliability degree.

10. The distance measurement processing device according to claim 1, further comprising an image evaluation circuit configured to perform evaluation of the distance image on the basis of the reliability degree.

11. The distance measurement processing device according to claim 1, further comprising a neural-network processing circuit of a neural network type configured to output a predetermined result on the basis of the reliability degree.

12. An image processing method comprising:
acquiring a two-dimensional distance image having a measured distance as a pixel value and signal information concerning a signal value corresponding to the measured distance for each of pixels in the two-dimensional distance image; and
setting, for each of the pixels of the two-dimensional distance image, each of the pixels as a center pixel and generating a reliability degree based on information concerning the pixels having distance values equal to or smaller than a predetermined value from a distance value of the center pixel among the pixels contiguous within a predetermined range from the center pixel and a signal value corresponding to the center pixel.

13. The image processing method according to claim 12, wherein the reliability degree is a value obtained by multiplying the signal value of the center pixel by a square root of a number of pixels of the pixels having the distance values within the predetermined range from the distance value of the center pixel.

14. The image processing method according to claim 12, wherein the reliability degree is a value obtained by dividing an added-up value, which is obtained by respectively adding up the signal values corresponding to the pixels having the distance values within the predetermined range by a number of pixels of the pixels having the distance values within the predetermined range from the distance value of the center pixel, and further multiplying a divided value by a square root of the number of pixels.

15. The image processing method according to claim 12, wherein the reliability degree is a value obtained by dividing an added-up value, which is obtained by respectively adding up multiplied values obtained by multiplying the signal values corresponding to the pixels having the distance values within the predetermined range by a predetermined coefficient, by an added-up value, which is obtained by adding up the predetermined coefficient multiplying the signal values, and further multiplying a divided value by a square root of the number of pixels of the pixels having the distance values within the predetermined range.

16. The image processing method according to claim 12, wherein the reliability degree is based on an added-up value obtained by respectively adding up powers of the signal values corresponding to the pixels having the distance values within the predetermined range.

17. The image processing method according to claim 12, wherein the reliability degree is based on an added-up value obtained by respectively adding up values obtained by multiplying, by a predetermined coefficient, powers of the signal values corresponding to the pixels having the distance values within the predetermined range.

18. The image processing method according to claim 17, wherein
the signal value is a value at a point in time corresponding to the measured distance of a time-series digital signal obtained by accumulating a plurality of time-series digital signals on the basis of a weight value, and
the coefficient is a value based on the weight value.

19. The image processing method according to claim 16, wherein the reliability degree is based on a square root of the added-up value.

20. A distance measuring system comprising a distance measuring device and a distance measurement processing device, wherein
the distance measuring device includes:
an acquirer configured to acquire, on the basis of similarity between a first digital signal obtained by digitizing reflected light of laser light irradiated in a first irradiation direction and a second digital signal obtained by digitizing reflected light of laser light irradiated in a second irradiation direction different from the first irradiation direction, a weight value of the second digital signal;
an integrator configured to accumulate, on the first digital signal, a signal obtained by weighting the second digital signal with the weight value and generate a third digital signal;
a distance measurer configured to obtain a distance value to a target object on the basis of a time difference between irradiation timing of the laser light and timing of a peak position in the third digital signal and obtain a signal value corresponding to the peak position in the third digital signal; and
a controller configured to change the first irradiation direction, and
the distance measurement processing device includes:
an information acquirer configured to acquire a two-dimensional distance image having the distance value as a pixel value and signal information concerning the signal value corresponding to the distance value for each of pixels in the two-dimensional distance image; and
a reliability-degree generator configured to set, for each of the pixels of the two-dimensional distance image, each of the pixels as a center pixel and generate a reliability degree based on information concerning the pixels having distance values equal to or smaller than a predetermined value from a distance value of the center pixel among the pixels contiguous within a predetermined range from the center pixel and a signal value corresponding to the center pixel.

* * * * *